(12) United States Patent
Faramarzi et al.

(10) Patent No.: US 12,094,178 B2
(45) Date of Patent: Sep. 17, 2024

(54) COMPLEXITY REDUCTION OF VIDEO-BASED POINT CLOUD COMPRESSION ENCODING USING GRID-BASED SEGMENTATION

(71) Applicant: Samsung Electronics Co., Ltd., Suwon-si (KR)

(72) Inventors: Esmaeil Faramarzi, Richardson, TX (US); Madhukar Budagavi, Plano, TX (US); Rajan Laxman Joshi, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 17/445,351

(22) Filed: Aug. 18, 2021

(65) Prior Publication Data

US 2022/0058833 A1 Feb. 24, 2022

Related U.S. Application Data

(60) Provisional application No. 63/185,134, filed on May 6, 2021, provisional application No. 63/079,694, filed (Continued)

(51) Int. Cl.
*G06T 7/10* (2017.01)
*G06T 9/00* (2006.01)
*G06T 17/20* (2006.01)

(52) U.S. Cl.
CPC .............. *G06T 9/001* (2013.01); *G06T 7/10* (2017.01); *G06T 17/205* (2013.01)

(58) Field of Classification Search
CPC .......... G06T 9/001; G06T 7/10; G06T 17/205
(Continued)

(56) References Cited

U.S. PATENT DOCUMENTS

| 4,821,213 | A | * | 4/1989 | Cline | ..................... G06T 17/00 345/426 |
| 2013/0169638 | A1 | * | 7/2013 | Carbonera | .............. G06T 11/60 345/419 |

(Continued)

FOREIGN PATENT DOCUMENTS

WO 2020/145598 A1 7/2020

OTHER PUBLICATIONS

Samsung Electronics, "[V-PCC] [New Proposal] TMC2 Encoder Speedup Using Grid-Based Segmentation", International Organisation for Standardisation, ISO/IEC JTC1/SC29/WG11 MPEG2020/m56857, Coding of Moving Pictures and Audio, Apr. 2021, 4 pages.

(Continued)

*Primary Examiner* — Stephen P Coleman

(57) ABSTRACT

An encoding device and a method for point cloud encoding are disclosed. The method includes segmenting an area including points representing a three-dimensional (3D) point cloud into multiple voxels. The method also includes generating a patch information for each of the multiple voxels that include at least one of the points of the 3D point cloud. The method further includes assigning the patch information of the multiple voxels to the points included in each respective voxel, to generate patches that represent the 3D point cloud. Additionally, the method includes generating frames that include pixels that represent the patches. The method also includes encoding the frames to generate a bitstream and transmitting the bitstream.

18 Claims, 20 Drawing Sheets

Related U.S. Application Data on Sep. 17, 2020, provisional application No. 63/068,630, filed on Aug. 21, 2020.

(58) Field of Classification Search
USPC .......................................................... 382/232
See application file for complete search history.

(56) References Cited

U.S. PATENT DOCUMENTS

| | | |
|---|---|---|
| 2019/0087979 A1 | 3/2019 | Mammou et al. |
| 2019/0197739 A1 | 6/2019 | Sinharoy et al. |
| 2020/0175726 A1 | 6/2020 | Kuma et al. |
| 2020/0221134 A1* | 7/2020 | Faramarzi ............ H04N 19/597 |

OTHER PUBLICATIONS

International Search Report of the International Searching Authority dated Dec. 1, 2021, in connection with International Application No. PCT/KR2021/011218, 4 pages.

Cohen, et al., "Compression of 3-D point clouds using hierarchical patch fitting," 2017 IEEE International Conference on Image Processing (ICIP), 2017, 5 pages.

Vo, et al., "Octree-based region growing for point cloud segmentation," ISPRS Journal of Photogrammetry and Remote Sensing, vol. 104, Jun. 2015, 37 pages.

\* cited by examiner

COMPLEXITY REDUCTION OF VIDEO-BASED POINT CLOUD COMPRESSION ENCODING USING GRID-BASED SEGMENTATION

CROSS-REFERENCE TO RELATED APPLICATION AND CLAIM OF PRIORITY

This application claims priority under 35 U.S.C. § 119(e) to Provisional Patent Application No. 63/068,630, filed on Aug. 21, 2020, Provisional Patent Application No. 63/079,694, filed on Sep. 17, 2020, and Provisional Patent Application No. 63/185,134, filed on May 6, 2021. The above-identified provisional patent applications are hereby incorporated by reference in their entirety.

TECHNICAL FIELD

This disclosure relates generally to multimedia data. More specifically, this disclosure relates to an apparatus and a method for compressing point clouds using grid-based segmentation.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds, can be used in the immersive environment.

Point clouds are a set of points in 3D space that represent an object. Point clouds are common in a variety of applications such as gaming, 3D maps, visualizations, medical applications, augmented reality, virtual reality, autonomous driving, multi-view replay, 6 degrees of freedom (6DoF) immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) video frames that can be compressed and reconstructed on a different device in order to be viewed by a user.

SUMMARY

This disclosure provides complexity reduction of video-based point cloud compression encoding using grid-based segmentation.

In one embodiment an encoding device is provided. The encoding device includes a processor and a communication interface. The processor is configured to segment an area including points representing a three-dimensional (3D) point cloud into multiple voxels. The processor is also configured to generate a patch information for each of the multiple voxels that include at least one of the points of the 3D point cloud. The processor is further configured to assign the patch information of the multiple voxels to the points included in each respective voxel, to generate patches that represent the 3D point cloud. Additionally, the processor is configured to generate frames that include pixels that represent the patches. The processor is also configured to encode the frames to generate a bitstream. The communication interface processor is configured to transmit the bitstream.

In another embodiment, a method for point cloud encoding is provided. The method includes segmenting an area including points representing a 3D point cloud into multiple voxels. The method also includes generating a patch information for each of the multiple voxels that include at least one of the points of the 3D point cloud. The method further includes assigning the patch information of the multiple voxels to the points included in each respective voxel, to generate patches that represent the 3D point cloud. Additionally, the method includes generating frames that include pixels that represent the patches. The method also includes encoding the frames to generate a bitstream and transmitting the bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
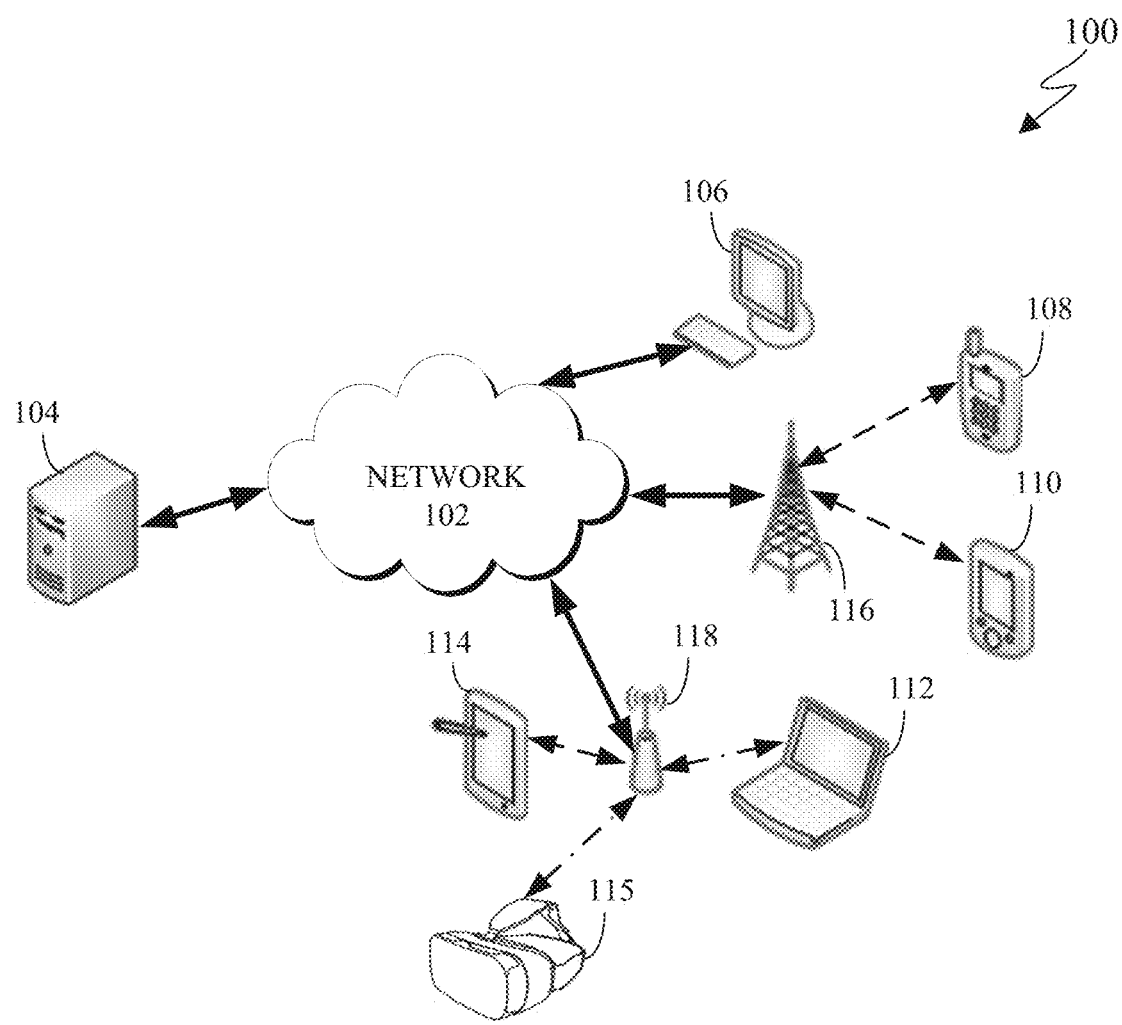
FIG. 1 illustrates an example communication system in accordance with an embodiment of this disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Virtual reality (VR) is a rendered version of a visual scene, where the entire scene is computer generated. Augmented reality (AR) is an interactive experience of a real-world environment where objects that reside in the real-world environment are augmented with virtual objects, virtual information, or both. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to detected head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). An HMD represents one of many types of devices that provide AR and VR experiences to a user. An HMD is a device that enables a user to view the VR scene and adjust the displayed content based on movements of the head of the user. Typically, an HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned at a particular geometric location within 3D space. In addition to a point having a geometric location, the points can include zero or more attributes (such as color, texture, reflectance, intensity, normal, material properties, motion, and the like). A point cloud can be similar to a virtual object in a VR or AR environment. A mesh is another type of a virtual representation of an object in a VR or AR environment. For example, a triangular mesh is similar to a point clod as it includes positional information, attributes at vertices, but also includes connectivity information between vertices. A point cloud or a mesh can be an object, multiple objects, a virtual scene (which includes multiple objects), and the like. As described above, point clouds and meshes are commonly used in a variety of applications, including gaming, 3D mapping, visualization, medicine, AR, VR, autonomous driving, multi-view replay, 6 DoF immersive media, to name a few. As used herein, the terms point cloud, 3D point cloud, 3D mesh, and mesh are used interchangeably.

Point clouds represent volumetric visual data. Point clouds consist of multiple points positioned in 3D space, where each point in a 3D point cloud includes a geometric position represented by 3-tuple (X, Y, Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In other embodiments, the points are positioned throughout both the internal structure and external surface of the object.

In addition to the geometric position of a point (the location of the point in 3D space), each point in the point cloud can also include zero or more attributes such as color, texture, reflectance, intensity, surface normal, and the like. In some embodiments, a single point of a 3D point cloud can have no attributes. In other embodiments, a single point of a 3D point cloud can have one or more attributes. In some applications, point clouds can also be used to approximate light field data in which, each point includes multiple view-dependent, color information (R, G, B or Y, U, V triplets).

A single point cloud can include billions of points, with each point associated with a geometric position and zero or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, a Green value, and a Blue value, then each color component (Red, Green, and Blue) uses eight bits, totaling the twenty-four bits. As a result, a single point with a ten-bit geometric data, per coordinate, and an eight-bit color attribute data, per color value, occupies fifty-four bits. Each additional attribute increases the bits required for a single point. If a frame includes one million points (and each point includes geometric data and color attribute data), the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to render and display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to reduce the volume of data (bandwidth) that is used when a point cloud is transmitted from one device (such as a source device) to another device (such as a display device or user device). Certain dedicated hardware components can be used to meet the real-time demands or reduce delays or lags in the transmitting and rendering a 3D point cloud; however, such hardware components are often expensive. Additionally, many video codecs are not able to encode and decode 3D video content, such as a point cloud. Compressing and decompressing a 3D point cloud by leveraging existing 2D video codecs enables the encoding and decoding of a point cloud to be widely available without the need for new or specialized hardware. According to embodiments of the present disclosure, when the point cloud is converted from a 3D representation to a 2D representation, existing video codecs can be used to compress and reconstruct a point cloud.

Embodiments of the present disclosure provide systems and methods for converting an 3D point cloud into a 2D representation that can be transmitted and then reconstructed into the 3D point cloud for rendering. An encoder converts an input 3D a point cloud onto multiple 2D frames (such as geometry frames, attribute frames, and occupancy map frames). The 2D frames can represent video frames. The 2D video frames can be encoded (using video codecs such as HEVC, AVC, VP9, VP8, VVC, and the like) to compress the 2D frames for transmission via a bitstream. A decoder receives and decodes the bitstream and then reconstructs the 3D point cloud from the 2D frames such that the 3D point cloud can be rendered, displayed, and then viewed by a user. Embodiments of the present disclosure describe systems and methods for enabling partial decoding of the received bitstream representing a point cloud. Accordingly, a decoder need only decode and render a portion of the received bitstream representing a portion of the point cloud, instead of decoding the entirety of the point cloud.

To convert an 3D point cloud to a 2D representation that can be transmitted using 2D video frames, the point cloud is deconstructed from a 3D state into multiple patches which are packed into the 2D video frames. Points of the 3D point cloud that are represented in one patch in a first frame correspond to the same points that are represented in another patch in a second frame when the two patches are positioned at over the same coordinates. For example, a pixel at the position (u, v) in a frame that represents geometry is the geometry position of a pixel at the same (u, v) position in a frame that represents an attribute such as color. In other embodiments, the patches in one frame represent multiple attributes associated with the points of the point cloud, such as a geometric position of the points in 3D space and color.

To deconstruct a 3D point cloud for transmission from one device to another, the geometric positions of the points of the point cloud are separated from the attribute information of the points. Projections of the 3D point cloud are made with respect to different projection planes, such that the 3D point cloud is separated into multiple clusters of points which are represented as patches on 2D video frames. A first set of frames can include values representing geometry positions of the points. Each additional set of frames can represent different attributes of the point cloud. For example, one attribute frame can include values representing color information associated with each of the points. The patches representing the geometry and attribute information (if present) are packed into geometry video frames and attribute video frames, respectively, where each pixel within any of the patches corresponds to a point in 3D space. The geometry video frames are used to encode the geometry information, and each of the corresponding attribute video frames (if present) are used to encode a corresponding attribute (such as color) of the 3D point cloud.

Figure 4A:
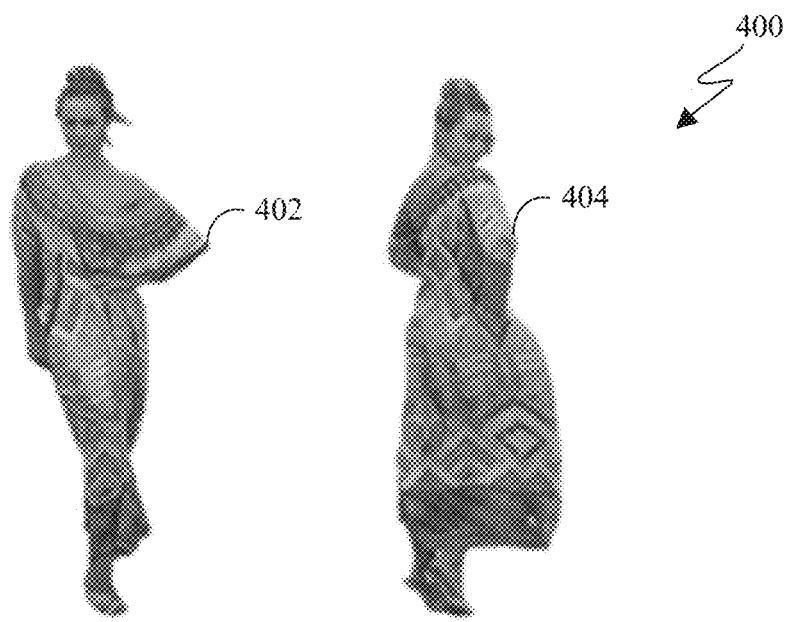
FIG. 4A illustrates an example 3D point cloud in accordance with an embodiment of this disclosure.
Figure 4B:
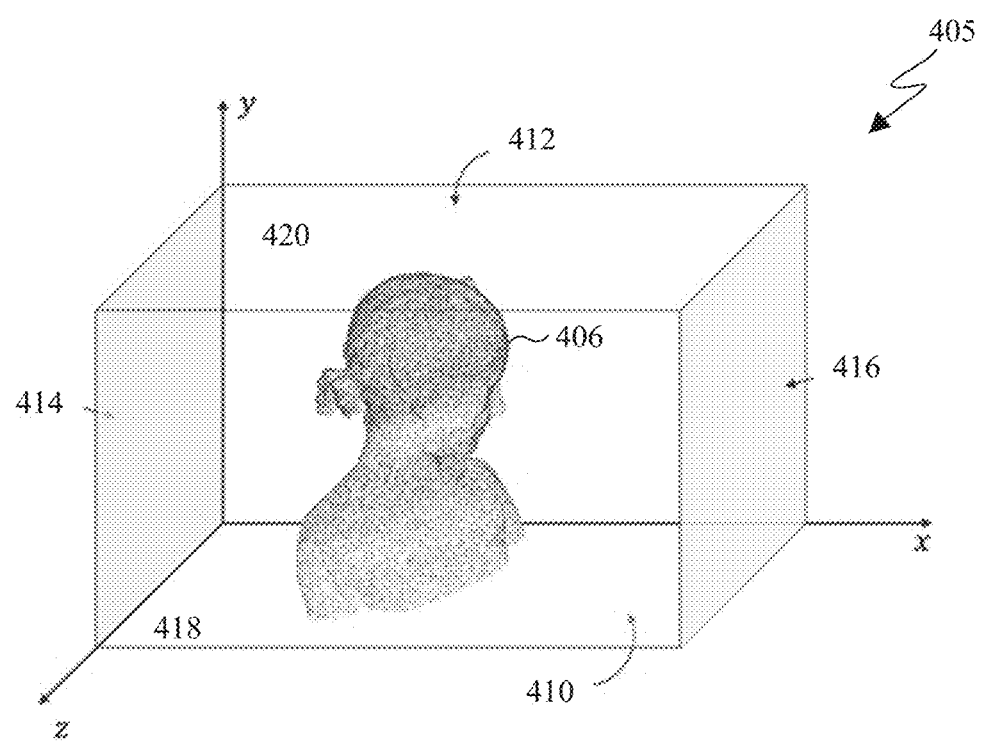
FIG. 4B illustrates a diagram of a point cloud that is surrounded by multiple projection planes in accordance with an embodiment of this disclosure.
Figure 4C:
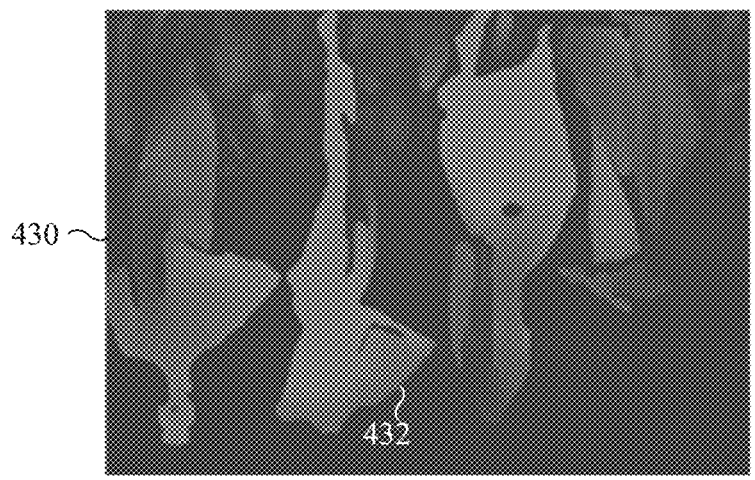
FIGS. 4C and 4D illustrate example 2D frames that include patches representing the 3D point cloud of FIG. 4A in accordance with an embodiment of this disclosure.
Figure 4D:
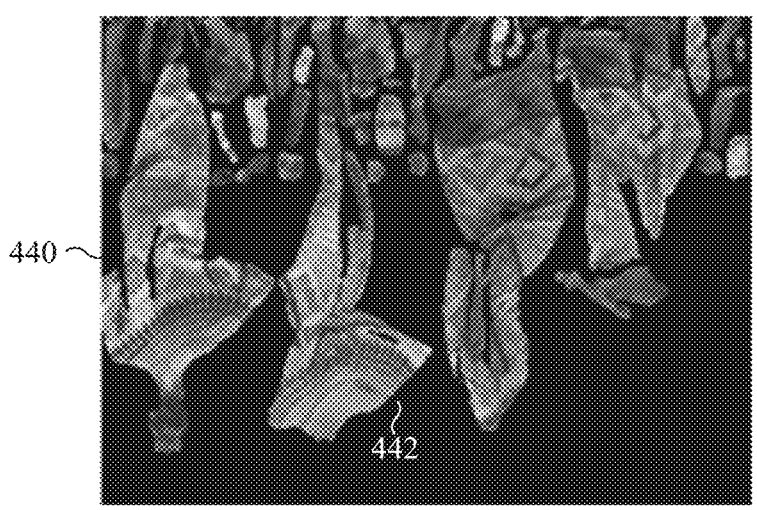

When the point cloud is deconstructed to fit on multiple 2D video frames and compressed, by an encoder, the frames can be transmitted using less bandwidth than used to transmit the original point cloud. FIGS. 4A-4D, which are described in greater detail below, illustrate various stages of projecting a point cloud onto different plans and thereafter storing the projections into 2D frames. For example, FIG. 4A, illustrates two views of a 3D point cloud, illustrating that a point cloud can be a 360° view of an object. FIG. 4B illustrates the process of projecting a 3D point cloud onto different planes. After the point cloud (such as the point cloud of FIG. 4A) is projected onto different planes, FIGS. 4C and 4D illustrate a geometry frame and an attribute frame (which represents the color of the points of the 3D point cloud), respectively, which include patches corresponding to the various projections.

An encoder can distinguish between geometry and attributes associated with the points of a point cloud. Various elements of a point cloud are clustered (using some criteria such as normal direction, distance to projected frames, contiguity, and the like) and are projected onto different planes (e.g. XY, YZ, ZX plane). For example, the points can be grouped into voxels and the voxels are projected onto the different planes. That information is the provided back to the points for further processing. By projecting voxels, that represent multiple points, instead of all of the points of a point cloud reduces bandwidth used for generating 2D patches representing the 3D point cloud. Furthermore, for each projection plane, the points may be projected to a near plane or a far plane. FIG. 4B, discussed in greater detail below, describes the projection planes. Each of the clusters shows up as a patch when projected on a plane. The patches are sorted and packed into 2D video frame(s) storing the geometry. In certain embodiments, there may be zero or more attribute frames associated with each geometry frame. The 2D plane in which the patches are packed is referred to as a canvas. In certain embodiments, there could be multiple points being projected to the same pixel on the canvas, as such, two (or more) maps may be considered for patch projection. In case of multiple maps, for each map, a geometry video is formed. Similarly, for each map and each attribute, an attribute video is formed. Each video is then encoded with a video codec such as HEVC, AVC, VP9, VP8, JVET, AVC or the like.

The geometry video frames are used to encode the geometry coordinates of the points of the 3D point cloud. A location (u, v) of a pixel in the geometry frame corresponds to a (X, Y, Z) location of a point in 3D space. For example, the two transverse coordinates (with respect to the projection plane) of a 3D point corresponds to the column and row indices in the geometry video frame (u, v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

The encoder can also generate an occupancy map (also referred to an occupancy map frame). The occupancy map shows the location of projected points in the 2D videos frames. For each canvas, there is a single occupancy map that is shared by all the maps. For each pixel on the canvas, the occupancy map specifies whether that pixel is occupied, that is, whether it is part of a patch. The occupancy map shows the location of projected points in the 2D videos frames. For example, since the patches may not occupy the entirety of the generated frames, the occupancy map indicates which pixels of the geometry frame and attribute frame correspond to a point of the point cloud and which pixels are empty/invalid and do not correspond to a point of the point cloud (such as a pixel that represents padding). In certain embodiments, the occupancy map frame is compressed.

After generating the geometry frames and the occupancy map frames, the frames can be compressed by leveraging various video compression codecs, image compression codecs, or both. For example, the encoder first generates and then compresses the geometry frames using a 2D video codec such as HEVC. In certain embodiments, the encoder also encodes the occupancy map frames. In certain embodiments, the encoder smooths the geometry of the reconstructed point cloud. It is noted that based on whether the encoder smooths the geometry of the reconstructed point cloud affects how the decoder reconstructs the 3D point cloud.

To generate an attribute frame (such as the color of the 3D point cloud), in some embodiments, the encoder decodes the encoded geometry frame (and the occupancy map frames if they were encoded) and reconstructs the 3D coordinates of the 3D point cloud. The encoder may interpolate the color values of each point from the color values of original point cloud to the corresponding geometry points of the smoothed geometry or the reconstructed geometry. The interpolated color values are then packed into a color frame which is compressed. Accordingly, the geometry video frames are used to encode the geometry information, and the corresponding attribute video frames are used to encode the attribute (such as color) of the point cloud.

For example, after the geometry frames and occupancy maps are formed, they are coded using a video codec such as HEVC. The geometry frames (and occupancy map videos if they were previously encoded) are decompressed. The encoder then reconstructs the geometry of the 3D point cloud using the decoded geometry frames and the occupancy map video frames. The attribute video frames are generated using the occupancy map frames, the input point cloud, and patch information and the reconstructed geometry of the 3D point cloud.

The encoder can also generate patch information. The patch information includes information about the patches in the frames (such as the geometry video frames, the attribute video frames, the occupancy map frames, and the like). The patch information can include the positioning of the patches within the 2D frame, the offsets for the patch segment in the 3D point cloud space, the plane on which the patch is projected on, and the like. The patch information can include information about the position and size of patches and their orientation in patch information, the position and size of the patches in the 3D space as well as certain other properties of the patches.

In certain embodiments, the patch information includes 3D information and 2D information. Regarding the 3D information, the patch information can specify the 3D locations of a patch, such as the location of a patch in 3D space. The patch information can also specify the 3D offset of a patch. Regarding the 2D information, the patch information can specify where the patches are located on a grid of a 2D frame, as well as the size of the patch. The patch information can also specify additional information related to the patches such as information about the type of patch.

The compressed geometry frames, the compressed color frames (and any other attribute frame), the occupancy map frame, and the patch information can be multiplexed to generate a bitstream. The encoder or another device then transmits the bitstream that includes the 2D frames to a different device. It is noted that the terms "bitstream," "sub-bitstream," and "substream" may be used interchangeably in the disclosure.

A decoder receives the bitstream, decompresses the bitstream into the frames, and reconstructs the point cloud based on the information within the frames. After the point cloud is reconstructed, the 3D point cloud can be smoothed to improve the visual quality of the 3D point cloud. Thereafter the reconstructed 3D point can be rendered and displayed for a user to observe.

Embodiments of the present disclosure provide systems and methods for improving the patch generation process. The patch generation process is the most complex operation during the encoding process. For example, during the patch generation process, each point of the point cloud is assigned to a projection plane and then a smoothing operation can refine the projection plane that each point is projected onto. Since a point cloud can include millions of points, the patch generation process requires lots of processing power.

Therefore, embodiments of the present disclosure provide systems and methods that reduce the complexity for generating 2D patches that represent a 3D point cloud. According to embodiments of the present disclosure the patch generation process includes a point to voxel conversion operation, a normal estimation operation, an initial patch segmentation operation, a refine segmentation operation, a voxel-to point data transfer operation, and a patch segmentation operation.

The point to voxel conversion operation segments the point cloud into multiple voxels. The normal estimation operation estimates normal vectors that are perpendicular to the point cloud surface. A normal vector can be associated with one of the voxels.

The initial patch segmentation operation projects each voxels to one of the projection planes surrounding the point cloud. For example, the projection is based on the directional proximity of the normal vector of each voxel with respect to a normal vector of each of the projection planes. It is noted that any number and shape of projection planes can be used. Example shapes include cube, polygon, octagonal, cylindrical spherical, and the like.

Since the initial segmentation operation projects voxels representing multiple points to the projection planes, neighboring points of the point cloud could be assigned to different projection planes. When different projection planes are assigned to points that neighbor each other can result in scattered patches with jagged (unsmooth) edges in the projected 2D frames. Unsmoothed patches (due to jagged edges) that are included in the frames can increase the processing power necessary to encode the frames, create artifacts in the reconstructed point cloud, and reduce the compression performance of the point cloud codec. As such, the refine segmentation operation smooths the voxels over the surface of the point cloud.

After the clusters of voxels are smoothed, the voxel to point data transfer operation, assigns the data from each voxel to the points it represent. The patch generation operation segments the points into patches.

Embodiments of the present disclosure also take into consideration that point clouds are typically very dense. As such, estimating the normal vectors of all points is computationally intensive. Moreover, the partitioning of points based on the direction of normal vectors, as performed in the initial segmentation operation, also uses a refine segmentation operation to smooth out the partitioning over the point cloud surface. The refine segmentation process involves a lot of processing power since it identifies the neighboring points of each point (using a data structure such as K-D Tree) iterate over the smoothing process. Therefore, embodiments of the present disclosure provide systems and methods to the complexity of the patch generation operation. According to some embodiments of the present disclosure, a direct patch generation approach for point cloud compression is performed without normal estimation. When normal estimation is skipped, the complexity of patch generation is significantly reduced.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and an HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decomposes the 3D point cloud to fit on 2D frames, compresses the frames to generate a bitstream. The bitstream can be transmitted to a storage device, such as an information repository, or one or more of the client devices 106-116. For another example, one of the client devices 106-116 can receive a 3D point cloud, decompose the 3D point cloud to fit on 2D frames, compress the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
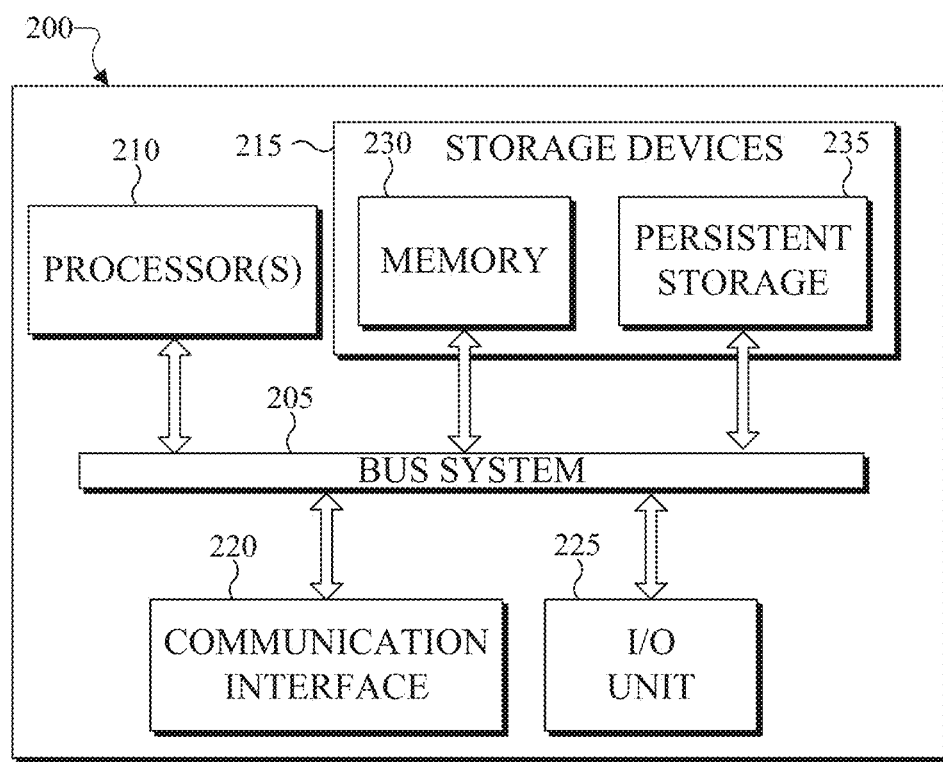
FIGS. 2 and 3 illustrate example electronic devices in accordance with an embodiment of this disclosure.
Figure 3:
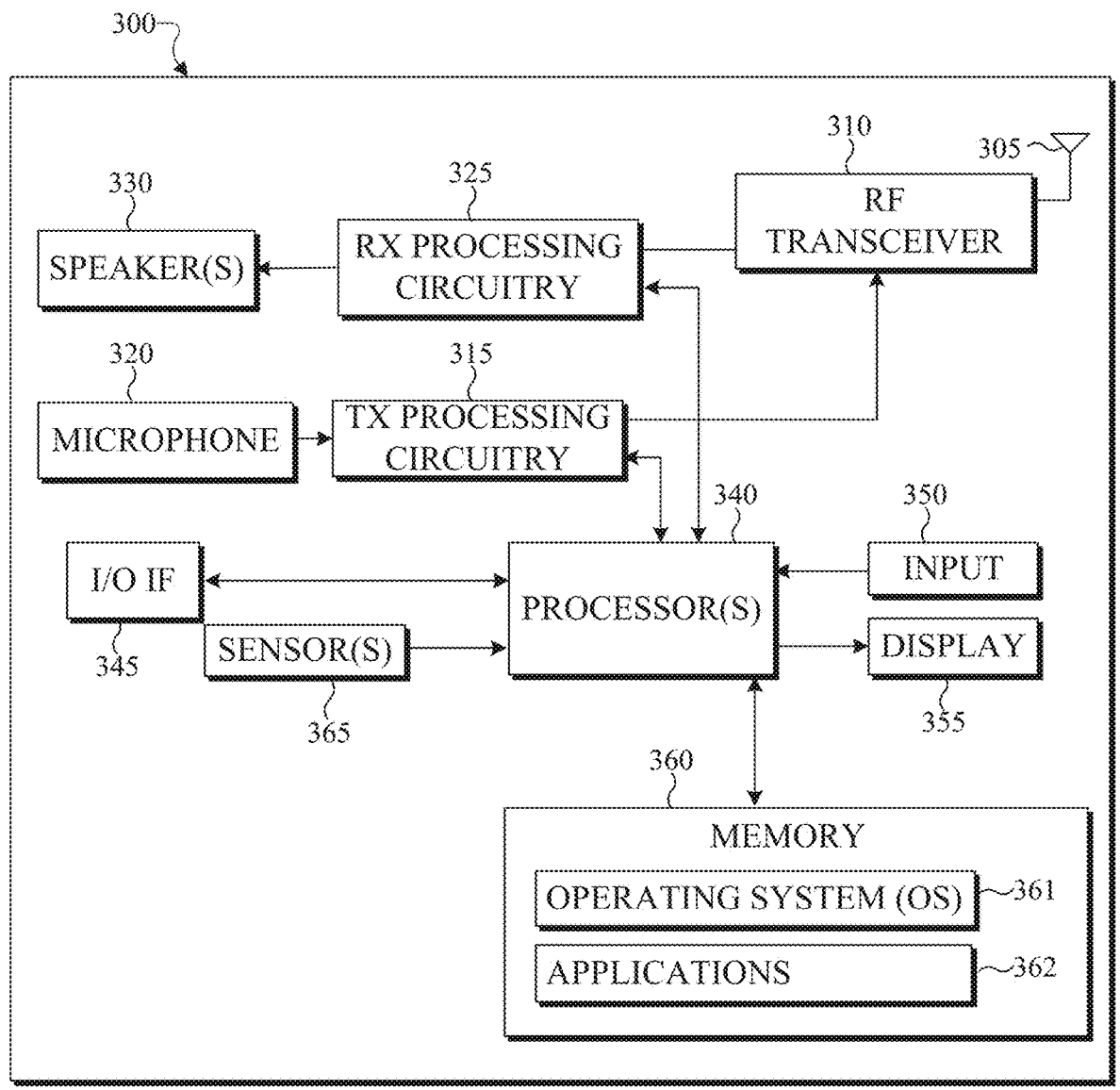

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the server 200 can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, when the 3D point cloud is encoded by an encoder, the encoder also decodes the encoded 3D point cloud to ensure that when the point cloud is reconstructed, the reconstructed 3D point cloud matches the 3D point cloud prior to the encoding.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random-access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image, or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within an HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

When encoding media content, such as a point cloud, the electronic device 300 or the server 200 of FIG. 2 can project the point cloud into multiple patches. For example, a cluster of points of the point cloud can be grouped together and represented as a patch on the 2D frames. A patch can represent a single attribute of the point cloud from a particular map (or layer). Patches that represent the same attribute and belong to the same map can be packed into individual 2D frames, respectively. For example, a particular attribute from all the points belonging to a particular map forms a 2D frame. The 2D frames are then encoded to generate a bitstream. During the encoding process additional content such as metadata, flags, parameter sets, syntax elements, occupancy maps, geometry smoothing parameters, one or more attribute smoothing parameters, and the like can be included in the bitstream.

Similarly, when decoding media content included in a bitstream that represents a 3D point cloud, the electronic device 300 decodes the received bitstream into frames. In certain embodiments, the decoded bitstream also includes an occupancy map, 2D frames, auxiliary information (such as one or more flags, one or more syntax elements, or quantization parameter size), and the like. A geometry frame can include pixels that indicate geographic coordinates of points of the point cloud in 3D space. Similarly, an attribute frame can include pixels that indicate the RGB (or YUV) color (or any other attribute) of each geometric point in 3D space. The auxiliary information can include one or more flags, one or more syntax elements, or quantization parameter size, one or more thresholds, geometry smoothing parameters, one or more attribute smoothing parameters, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4E:
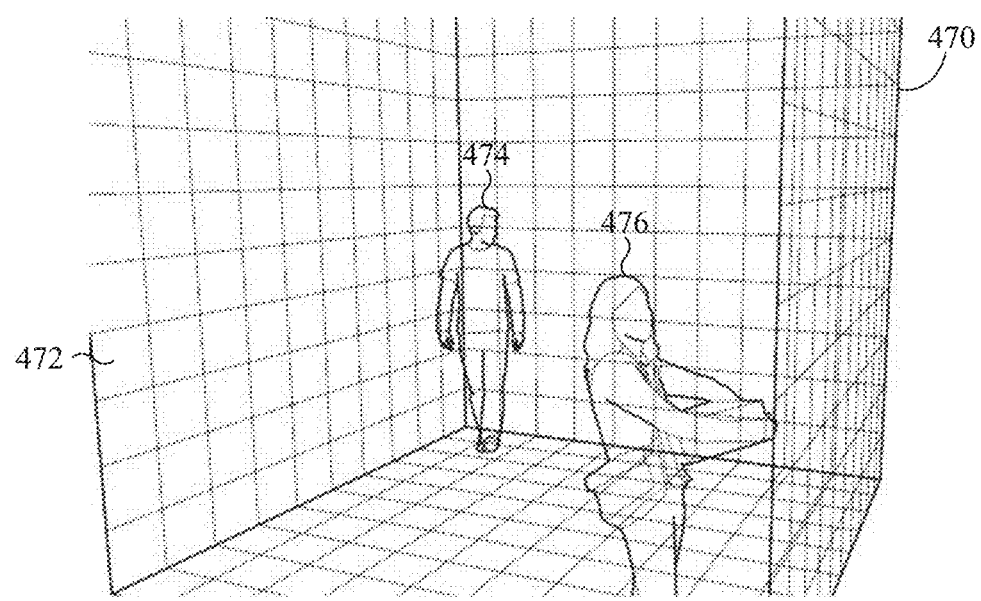
FIG. 4E illustrates an area that is segmented into multiple voxels and includes point clouds in accordance with an embodiment of this disclosure.

FIGS. 4A, 4B, 4C, 4D, and 4E illustrate various stages in generating frames that represent a 3D point cloud. In particular, FIG. 4A illustrate an example 3D point cloud 400 in accordance with an embodiment of this disclosure. FIG. 4B illustrates a diagram 405 of a point cloud that is surrounded by multiple projection planes in accordance with an embodiment of this disclosure. FIGS. 4C and 4D illustrate 2D frames that include patches representing the 3D point cloud 400 of FIG. 4A in accordance with an embodiment of this disclosure. For example, the FIG. 4C illustrates a 2D frame 430 that represents the geometric position of points of the 3D point cloud 400, while the FIG. 4D illustrates the frame 440 that represents the color associated with points of the 3D point cloud 400. In certain embodiments, the reconstructed point cloud 450 represents the 3D point cloud 400 of FIG. 4A, but reconstructed for rendering on a user device, while the 3D point cloud 400 of FIG. 4A can be located on a server. FIG. 4E illustrates an area 470 that is segmented into multiple voxels (such as voxel 472) and includes point clouds 474 and 476 in accordance with an embodiment of this disclosure.

The 3D point cloud 400 of FIG. 4A is a set of data points in 3D space. Each point of the 3D point cloud 400 includes a geometric position that provides the structure of the 3D point cloud and one or more attributes that provide information about each point such as color, reflectiveness, material, and the like. The 3D point cloud 400 represents the entire 360° object. That is, the point cloud can be viewed from various angles such as the front 402, the sides, and the back 402, the top, the bottom.

The diagram 405 of FIG. 4B includes a point cloud 406. The point cloud 406 can be similar to the 3D point cloud 400 of FIG. 4A. That is, the point cloud 406 represents an entire 360° object. The point cloud 406 is surrounded by multiple projection planes, such as the projection plane 410, 412, 414, 416, 418, and 420. The projection plane 410 is separated from the projection plane 412 by a predefined distance. For example, the projection plane 410 corresponds to the projection plane XZ0 and the projection plane 412 corresponds to the projection plane XZ1. Similarly, the projection plane 414 is separated from the projection plane 416 by a predefined distance. For example, the projection plane 414 corresponds to the projection plane YZ0 and the projection plane 416 corresponds to the projection plane YZ1. Additionally, the projection plane 418 is separated from the projection plane 420 by a predefined distance. For example, the projection plane 418 corresponds to the projection plane XY0 and the projection plane 420 corresponds to the projection plane XY1. It is noted that additional projection planes can be included and the shape that the projection planes form can differ. More or less projection planes can be used when assigning points to a particular projection plane. Moreover, the projection planes can be at various locations and angles. For example, certain projection planes can be at a 45 degree incline with respect to the other projection planes, Similarly, certain projection planes can be at a 90 degree angle with respect to other projection planes.

Converting a 3D point cloud into a 2D representation is based on projecting the points onto different projection planes to create patches. This step may result in small and scattered patches with jagged edges. Therefore, a refinement process is performed to smooth out the assignment of points to projection planes over the surface of the point cloud. The final step in the patch generation process is to form segments from points that are assigned to the same projection plane and form a connected component. In certain embodiments, the majority of points are projected into regular patches that preserve the shape of the input point cloud. Regular patches contain the depth values of points with respect to a projection plane and some auxiliary data needed by the decoder to reconstruct the points.

A raw patch (also referred to as a missed points patch) is a particular type of 2D patch for storing points that have not been projected onto any regular 2D patch by the patch generation (segmentation) process. For each point in a raw patch, the (X,Y,Z) coordinates of the point are coded. There is complete flexibility in terms of the order in which the points are included in a raw patch.

In certain embodiments, the points of the point cloud can be grouped into voxels, and the voxels are assigned to a particular projection plane, (such as the projection planes 410, 412, 414, 416, 418, and 420). The voxels that are near each other and are assigned to the same projection plane are grouped together. The points within each voxel are then assigned projection information (also referred to as patch information) of the corresponding voxel. The points are then organized into patches such as any of the patches as illustrated in FIGS. 4C and 4D.

Next, in the packing process, the generated patches are packed into 2D video frames, such as the frames of FIGS. 4C and 4D. Multiple maps may be used to account for points from the patch that get projected to the same 2D position but have different depths.

FIGS. 4C and 4D illustrate the 2D frames 430 and 440, respectively. The frame 430 is a geometry frame as it illustrates the geometric location of each point of the 3D point cloud 400 of FIG. 4A. The frame 430 includes multiple patches (such as a patch 432) representing the depth values of the 3D point cloud 400. The value of each pixel in the frame 430 is represented as a lighter or darker color and corresponds to a distance each pixel is from a particular projection plane (such as one of the projection planes 410, 412, 414, 416, 418, and 420 of FIG. 4B).

The frame 440 is a color frame (one type of attribute) as it provides the color of each point of the 3D point cloud 400 of FIG. 4A. The frame 440 includes multiple patches (such as a patch 442) representing values corresponding to the color of a point in the 3D point cloud 400.

Each of the patches in FIGS. 4C and 4D can be identified by an index number. Similarly, each pixel within a patch can be identified by its location within the frame as well as the index number of the patch to which the pixel is within. The patch index number can be stored in the patch information.

A correspondence (or mapping) exists between the frame 430 and the frame 440. That is, each pixel in the frame 430 corresponds to a pixel at the same location in the frame 440. Each pixel of color in the frame 440 corresponds to a particular geometry pixel in the frame 430. For example, a mapping is generated between each pixel in the frame 430 and the frame 440. For example, each pixel within the patch 432 corresponds to a point in 3D space, and each pixel within the patch 442 provides a color to a point of the 3D point cloud that is represented at the same location in the patch 432. As shown in the frames 430 and 440, some of the pixels correspond to valid pixels that represent the 3D point cloud 400 while other pixels (the black area in the background) correspond to invalid pixels that do not represent the 3D point cloud 400. In certain embodiments, the black area in the background could be filled with values for padding purposes. In certain embodiments, geometry frames (such as the frame 430), attribute frames (such as the frame 440), and occupancy map frames can be down sampled, so the correspondence does not match up exactly.

FIG. 4E illustrates an area 470 that is segmented into multiple voxels, such as the voxel 472. That is, the area 470 is partitioned into a grid, where each cell of the grid corresponds to a single voxel, such as the voxel 472. For example, a 10-bit point cloud with a geometry in the range of [0, 1023], and the size of each voxel is 8×8×8, the overall grid size (area 470) would be 128×128×128, since 1024 (the geometry range) divided by 8 (the size of the voxel), yields the value 128.

The point cloud 474 and the point cloud 476 are within the area 470. Certain voxels include points of the point cloud 474 or the point cloud 476, while other voxels are empty. Filled voxels are voxels that include one or more points of a point cloud. In certain embodiments, an index is generated by the encoder. The index lists each of the voxels and indicates whether a voxel is empty or filled. The index can also identify each point of the point clouds 474 and 476 (by point number) that are included in each filled voxel. That is, the encoder can map the points of the point clouds 474 and 476 and record the indices of the points that are inside each filled voxel. For example, the index can state that the $100^{th}$ voxel includes the $5^{th}$ point, the $40^{th}$ point and the $10,200^{th}$ point, and the like. It is noted that the voxels do not overlap each other.

Although FIGS. 4A, 4B, 4C, 4D, and 4E illustrate example point cloud and 2D frames representing a point cloud, various changes can be made to FIGS. 4A, 4B, 4C, 4D, and 4E. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, 4D, and 4E do not limit this disclosure to any particular 3D object(s) and 2D frames representing the 3D object(s).

Figure 5A:
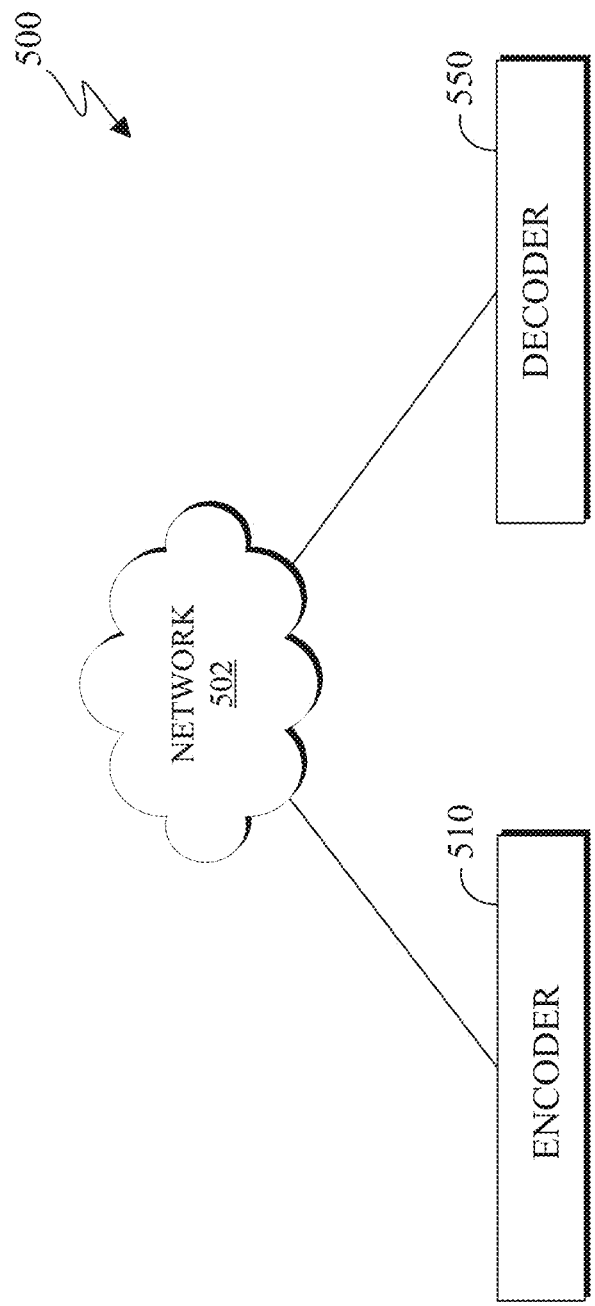
FIG. 5A illustrates a block diagram of an example environment-architecture in accordance with an embodiment of this disclosure.
Figure 5B:
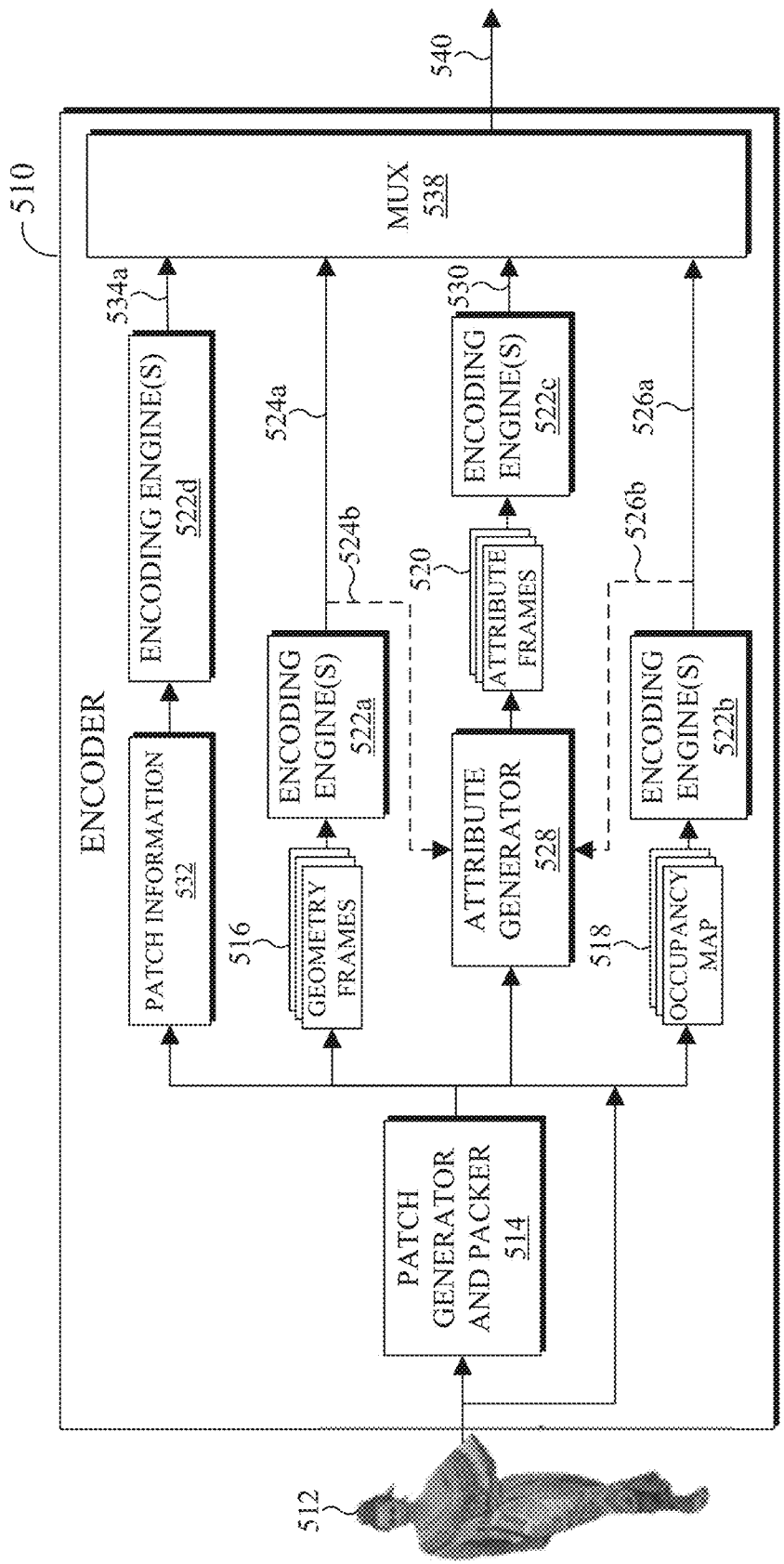
FIG. 5B illustrates an example block diagram of an encoder in accordance with an embodiment of this disclosure.
Figure 5C:
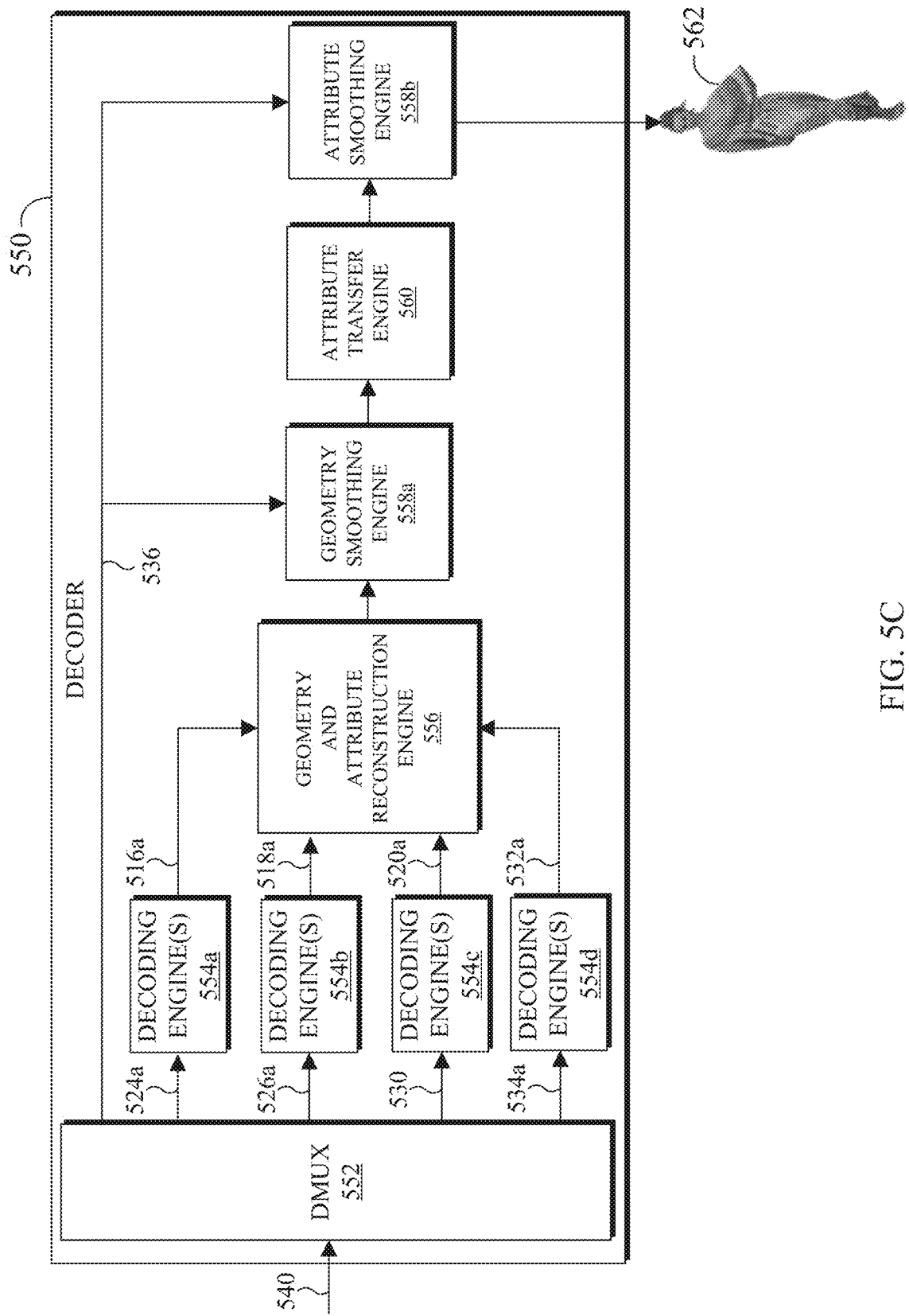
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A and FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The encoder 510 is described in greater detail in FIG. 5B, below. The decoder 550 is described in greater detail in FIG. 5C, below.

The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

Generally, the encoder 510, as shown in FIGS. 5A and 5B, receives 3D media content, such as a point cloud, from another device such as a server (similar to the server 104 of FIG. 1, the server 200 of FIG. 2), an information repository (such as a database), or one of the client devices 106-116. In certain embodiments, the encoder 510 can receive media content from multiple cameras and stitch the content together to generate a 3D scene that includes one or more point clouds.

The encoder 510 segments points of the point cloud into multiple patches that represent the projection. In certain embodiments, to segment the points into the multiple patches, the encoder 510 segments the point cloud input multiple voxels. The voxels are then projected onto different planes such as an XY plane, an YZ plane, and an XZ plane to generate patch information. The patch information is then transferred to the points within each voxel. A clusters of the points can represent a patch. The encoder 510 packs and stores information representing patches representing the point cloud onto a 2D frame. The 2D frames can be video frames. It is noted, a point of the 3D point cloud is located in 3D space based on a (X, Y, Z) coordinate value, but when the point is projected onto a 2D frame the pixel representing the projected point is denoted by the column and row index of the frame indicated by the coordinate (u, v). Additionally, 'u' and 'v' can range from zero to the number of rows or columns in the depth image, respectively.

Each of the 2D frames (such as the geometry frames 516 and the attribute frames 520) represents a particular aspect of the point cloud, such as one set of frames can represent geometry and another set of frames can represent an attribute (such as color). It should be noted that additional frames can be generated based on more layers as well as each additionally defined attribute.

The encoder 510 also generates an occupancy map frames 518 based on the geometry frames 516 to indicate which pixels within the frames are valid. Generally, the occupancy map indicates, for each pixel within a frame, whether the pixel is a valid pixel or an invalid pixel. For example, if a pixel in the occupancy map at coordinate (u, v) is valid, then the corresponding pixel in a geometry frame and the corresponding attribute frame at the coordinate (u, v) are also valid. If the pixel in the occupancy map at coordinate (u, v) is invalid, then the decoder skips the corresponding pixel in the geometry and attribute frames at the coordinate (u, v) for reconstruction purposes. An invalid pixel can include information such as padding that can increase the encoding efficiency but does not provide any information associated with the point cloud itself. Generally, the occupancy map is binary, such that the value of each pixel is either one or zero. For example, when the value of a pixel at position (u, v) of the occupancy map is one, indicates that a pixel at (u, v) of an attribute frame and the geometry frame is valid. In contrast, when the value of a pixel at position (u, v) of the occupancy map is zero indicates that a pixel at (u, v) of the attribute frame and the geometry frame is invalid, and therefore does not represent a point of the 3D point cloud. A non-binary occupancy map may be thresholded or processed to generate a binary occupancy map.

The encoder also generates patch information 532 that include information relating the pixels of the video frames to the point cloud. For example, the patch information 532 can indicate a 3D location of a patch that is stored in the video frames. The patch information 532 can also indicate where the patches are located on a 2D grid of a video frame. The patch information can also indicate the size of a patch (such as the number of pixels that correspond to a patch).

The encoder 510 transmits frames representing the point cloud as an encoded bitstream. The bitstream can be transmitted to an information repository (such as a database) or an electronic device that includes a decoder (such as the decoder 550) through the network 502. The encoder 510 is described in greater detail below in FIG. 5B.

As illustrated in FIG. 5B, the encoder 510 receives a 3D point cloud 512 and generates a bitstream 540. The bitstream 540 includes data representing a 3D point cloud 512. The bitstream 540 can include multiple bitstreams that are multiplexed together via a multiplexer 538. The bitstream 540 can be transmitted via the network 502 of FIG. 5A to another device, such as the decoder 550, an electronic device that includes the decoder 550, or an information repository. The encoder 510 also includes a patch generator and packer 514, one or more encoding engines (such as encoding engine 522a, 522b, 522c, and 522d which are collectively referred to as encoding engines 522), and an attribute generator 528.

The 3D point cloud 512 can be stored in memory (not shown) or received from another electronic device (not shown). The 3D point cloud 512 can be a single 3D object (similar to the 3D point cloud 400 of FIG. 4A), or a grouping of 3D objects. The 3D point cloud 512 can be a stationary object or an object which moves.

The patch generator and packer 514 is used for generating geometry frames 516, occupancy map frames 518, attribute information (which is used by the attribute generator 528 to generate the attribute frames 520), and patch information 532 (which includes patch information providing information about the patches, such as an index number that is associated with each patch).

The patch generator 514 generates patches by taking projections of the 3D point cloud 512. In certain embodiments, the patch generator 514 splits the geometry information and attribute information of each point of the 3D point cloud 512. The patch generator 514 can use multiple projection planes (similar to the projection plane 410, 412, 414, 416, 418, and 420 of FIG. 4D), to cluster the points of the 3D point cloud 512 to generate the patches.

The patch generator 514 determines the best projection plane for each point. The patches are generated based on clustering points of the 3D point cloud that are associated with a particular projection plane corresponding to the normal vector of each point. Generating 2D patches that represent the 3D point cloud can consume over 80% of the total encoding runtime of the encoder 510 when generating the bitstream 540. For example, the process of estimating the normal vector for the points of the input point cloud 512, in order to identify a particular projection plane that corresponds to each point, consumes high processing power, especially for large point clouds with millions of points. Accordingly, embodiments of the present disclosure describe methods to reduce the complexity for estimating the normal vector for every single point of the input point cloud 512.

Therefore, embodiments of the present disclosure describe a grid-based segmentation (GBS) approach to reduce the complexity of generating the patches. Embodiments of the present disclosure take into consideration that due to the closeness of point locations of the point cloud 512, neighboring points mostly have very similar normal directions. Therefore there is a high likelihood neighboring points will get segmented to the same patch. The patch generator 514 can group the points of the point cloud 512 into voxels prior to generating the patches. The voxels can be projected to projection planes based on a normal vector of the voxel. By identifying the normal vector of a voxel rather than each point within a voxel reduces the complexity of the patch generation process.

Accordingly, the patch generator 514 segments the point cloud 512 into multiple voxels, denoted as voxelization or point-to-voxel conversion. In certain embodiments, voxelization is performed using a uniform 3D grid that spanned over the dynamic range of the points, as shown in FIG. 4E, where each cell of the grid is a voxel. For example, if the geometry of the input point cloud has a 10-bit resolution in the range $[0, 2^{10}-1]=[0, 1023]$ and the voxel size is 8 in each three X, Y, and Z dimensions, there will be 1024/8=128 voxels along each dimension.

In other embodiments, size of each voxel of the 3D grid is not uniform. For example, a non-uniform grid may be used which has smaller voxels for highly dense regions and larger voxels for low-density areas of the input point cloud.

Regardless of whether a uniform grid or non-uniform grid is used, the location of a voxel can be described in the point domain. Similarly, the points represented by a voxel (the points inside a voxel) can be described in the voxel domain.

In certain embodiments, a center point of each voxel can be used to represent the position of a voxel in the point domain. For example, if a uniform grid with a voxel size of 8 is used, for a point with geometry position (x, y, z), the integer voxel position in the point domain can be obtained as $$\text{round}\left(\frac{(x, y, z)}{8}\right) \times 8$$

(other definitions of integer center point can also be used). Therefore, if a voxel contains three points (24, 1012, 535), (21, 1013, 534), and (24, 1016, 532), these points can be replaced with the center point (24, 1016, 536) in the voxelized point cloud, as identified on Equations (1), (2), ands (3).

$$\text{round}\left(\frac{24+21+24}{8}\right) \times 8 = 24 \quad (1)$$

$$\text{round}\left(\frac{1012+1013+1016}{8}\right) \times 8 = 1016 \quad (2)$$

$$\text{round}\left(\frac{535+534+532}{8}\right) \times 8 = 536 \quad (3)$$

In other embodiments, a centroid of the points inside a voxel can be used to represent the position of the voxel in the point domain. For example, the voxel position related to the three points in the previous example can be defined as the centroid of those points, which is the average value of each X, Y, and Z component. Equation (4) describes a definition for the integer centroid.

$$\text{Centroid} = \text{round}\left(\frac{24+21+24}{3}, \frac{1012+1013+1016}{3}, \frac{535+534+532}{3}\right) = (23, 1014, 534) \quad (4)$$

According to the above two embodiments (of using a center point or centroid to represent the position of the voxel in the point domain), the points inside each voxel are replaced with a single representative point inside each voxel to voxelize point cloud. Therefore, the input point cloud is converted to a point cloud with a similar dynamic range but less point density (such as down sampling the input points, which reduces the number of points) without downscaling their positions (reducing the geometry range). For example, if the input point cloud 512 includes 766,000 points with a geometry range of [9 1,012], a voxel size of two, reduces the number of points to 212,000 while the geometry range remains [9 1,012]. Similarly, a voxel size of four, reduces the number of points from 766,000 to 55,000 while the geometry range remains [9 1,012].

Additionally, the points inside a voxel can be represented by the voxel index along each dimension. In certain embodiments, the points inside a voxel can be described in the voxel domain. For example, a voxel containing the three points (24, 1012, 535), (21, 1013, 534), and (24, 1016, 532) is replaced with point (3, 127, 67) in the voxelized point cloud based on Equations (5), (6), and (7).

$$\left(\frac{24 \text{ or } 2 \text{ or } 24}{8}\right) = 3 \quad (5)$$

$$\left(\frac{1012 \text{ or } 1013 \text{ or } 1016}{8}\right) = 127 \quad (6)$$

$$\left(\frac{535 \text{ or } 534 \text{ or } 532}{8}\right) = 67 \quad (7)$$

In another example, the points inside a voxel can be described in the voxel domain by assigning the index number of the voxel to the points within the voxel. For instance, if there are eight points within a voxel all eight points are replaced with the index value of the voxel. If the voxel index value was zero (indicating that it is the first voxel) then all eight points are assigned a value of zero.

Therefore, the input point cloud 512 is converted to a point cloud with a smaller dynamic range but a similar point density. This can be similar to down sampling the input points as well as downscaling their positions. For example, if the input point cloud 512 includes 766,000 points with a geometry range of [9 1,012], a voxel size of two, reduces the number of points to 212,000 and the geometry range to [5

506]. Similarly, a voxel size of four, reduces the number of points from 766,000 to 55,000 and reduces the geometry range to [2 253].

The patch generator 514 applies a normal estimation operation, an initial segmentation operation, and a refined segmentation operation to the voxels. The normal estimation operation identifies the normal vector for each voxel. The normal vector is perpendicular to the surface of the point cloud. The initial segmentation operation partitions to voxels to projection plains based on the normal vector of each voxel. For example, if there are six projection planes (such as illustrated in FIG. 4B) then a voxel is assigned to one of the projection planes based on the proximity of the normal vector of that voxel to that projection plane. The refined segmentation operation smooths the partitioning of voxels over the surface of the point cloud since the initial segmentation operation can create noise.

After determining the best projection plane for each voxel the patch generator 514 assigns the patch information associated with a voxel to the points represented by that voxel. Accordingly, the points represented by a voxel are segmented into patches that can be packed by the frame packing 514 into the geometry frames 516 and the attribute frames 520.

Additionally, embodiments of the present disclosure describe that the patches that represent the point cloud 512 can be generated either partially or entirely from the voxels rather than from the points. By generating the patches from voxels (rather than points) reduces the complexity of generating the patches since the number of voxels less than the number of points. FIGS. 6A, 6B, 7, 8A, 8B, and 8C describe various methods for generating 2D patches representing the 3D point cloud. It is noted that FIGS. 6A and 8A describes the generating patches based on partially applied GBS while FIGS. 6B and 8B describes the generating patches based on entirely applied GBS. FIG. 7 describes the process for point to voxel conversion.

After determining the best projection plane for each point of the 3D point cloud 512 the patch generator and packer 514 segments the points into patch data structures that are packed frames, such as the geometry frames 516 and the geometry frame 430 of FIG. 4C. As illustrated in FIGS. 4C and 4D, discussed above, the patches are organized and placed within corresponding frames, such as the patch 432 is included in the geometry frame 430 and the patch 442 is included in the attribute frame 440. It is noted that patches representing different attributes of the same cluster of points include a correspondence or a mapping, such a pixel in one patch corresponds to the same pixel in another patch, based on the locations of the pixels being at the same position in the respective frames.

The occupancy map frames 518 represent occupancy maps that indicate the valid pixels in the frames (such as the geometry frames 516). For example, the occupancy map frames 518 indicate whether each pixel in the geometry frame 516 is a valid pixel or an invalid pixel. Each valid pixel in the occupancy map frames 518 corresponds to pixels in the geometry frames 516 that represents a position point of the 3D point cloud 512 in 3D space. In contrast, the invalid pixels are pixels within the occupancy map frames 518 that correspond to pixels in the geometry frames 516 that do not represent a point of the 3D point cloud 512 (such as the empty/black space in the frames 430 and 440 of FIGS. 4C and 4D). In certain embodiments, one of the occupancy map frames 518 can correspond to both a geometry frame 516 and an attribute frame 520 (discussed below).

For example, when the patch generator and packer 514 generates the occupancy map frames 518, the occupancy map frames 518 include predefined values for each pixel, such as zero or one. For example, when a pixel of the occupancy map at position (u, v) is a value of zero, indicates that the pixel at (u, v) in the geometry frame 516 is invalid. Similarly, when a pixel of the occupancy map at position (u, v) is a value of one, indicates that the pixel at (u, v) in the geometry frame 516 is valid and thereby includes information representing a point of the 3D point cloud.

The geometry frames 516 include pixels representing the geometry values of the 3D point cloud 512. The geometry frames 516 include the geographic information of points of the 3D point cloud 512. For example, the two transverse coordinates (with respect to the projection plane) of a 3D point corresponds to the column and row indices in the geometry video frame (u, v) plus a transverse-offset which indicates the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

In certain embodiments, the patch information 532 contain information about the patches. For example, the patch information 532 include positioning of the patches in the 2D frame, the offsets for the patch segment in the 3D point cloud space, the plane on which the patch is projected on, and the like. The patch information 532 can include information that relates the patches that are stored in the geometry frames 516 and occupancy map frames 518 to location on the 3D point cloud 512. The patch information can also indicate the size of a patch (such as the number of pixels that correspond to a patch).

The encoder 510 includes one or more encoding engines 522. In certain embodiments, the video frames (such as the geometry frames 516, the occupancy map frames 518, and the attribute frames 520) and the patch information 532 are encoded by independent encoding engines 522, as illustrated. In other embodiments, a single encoding engine performs the encoding of the frames.

The encoding engines 522 can be configured to support an 8-bit, a 10-bit, a 12-bit, a 14-bit, or a 16-bit, precision of data. The encoding engines 522 can include a video or image codec such as HEVC, AVC, VP9, VP8, VVC, EVC, AV1 and the like to compress the 2D frames representing the 3D point cloud. The one or more of the encoding engines 522 can compress the information in a lossy or lossless manner.

As illustrated, the encoding engine 522a receives geometry frames 516 and performs geometry compression to generate a geometry sub-bitstream 524a. The encoding engine 522b receives occupancy map frames 518 and performs occupancy map compression to generate an occupancy map sub-bitstream 526a. The encoding engine 522c receives attribute frames 520 and performs attribute compression to generate an attribute sub-bitstream 530. The encoding engine 522d receives patch information 532 and performs compression to generate a patch information sub-bitstream 534a. In certain embodiments, the patch information is not compressed.

In certain embodiments, the encoding engines 522 can subsample the video frames (such as the geometry frames 516, the occupancy map frames 518, and the attribute frames 520) and the patch information 532 differently. For example, the patch information 532 can be sized 1024×1024, the geometry frames 516 can be sized 512×512, the occupancy map frames 518 can be sized 256×256, and the attribute frames 520 can be sized 128×128. The sizes in this example are for explanation only and other sizes for the frames can be used. Additionally, some of the frames can be subsampled to the same size.

After the encoding engine 522a generates the geometry sub-bitstream 524a, a decoding engine (not shown) can decode the geometry sub-bitstream 524a to generate the reconstructed geometry frames 524b. Similarly, after the encoding engine 522b generates the occupancy map sub-bitstream 526a, a decoding engine (not shown) can decode the occupancy map sub-bitstream 526a to generate the reconstructed occupancy map frames 526b.

The attribute generator 528 generates the attribute frames 520 based on the attribute information from the 3D point cloud 512 provided by the patch generator and packer 514, the reconstructed geometry frames 524b, the reconstructed occupancy map frames 526b.

In certain embodiments, to generate one of the attribute frames 520 that represent color, the geometry frames 516 are compressed by the encoding engine 522a using a 2D video codec such as HEVC. The geometry sub-bitstream 524a is decoded to generate the reconstructed geometry frames 524b. Similarly, the occupancy map frame 518 is compressed using the encoding engine 522b and then decompressed to generate the reconstructed occupancy map frames 526b. The encoder 510 can then reconstruct the geometric locations of the points of the 3D point cloud based on the reconstructed geometry frames 524b and the reconstructed occupancy map frames 526b. The attribute generator 528 interpolates the attribute values (such as color) of each point from the color values of input point cloud to the reconstructed point cloud and the original point cloud 512. The interpolated colors are then segmented, by the attribute generator 528, to match the same patches as the geometry information. The attribute generator 528 then packs interpolated attribute values into an attribute frame 520 representing color. In other embodiments, the attribute generator can perform other methods for generating the attribute frames.

The attribute frames 520 represents one or more different attributes of the point cloud. For example, for one of the geometry frames 516 there can be zero or more corresponding attribute frames 520. The attribute frame can represent attributes such as color, texture, normal, material properties, reflection, motion, and the like. In certain embodiments, one of the attribute frames 520 can include color values for each of the geometry points within one of the geometry frames 516, while another attribute frame can include reflectance values which indicate the level of reflectance of each corresponding geometry point within the same geometry frame 516. Each additional attribute frame 520 represents other attributes associated with a particular geometry frame 516. In certain embodiments, each geometry frame 516 has at least one corresponding attribute frame 520.

In certain embodiments, the video frames (such as the geometry frames 516, the occupancy map frames 518, and the attribute frames 520) and the patch information can be the same size. In other embodiments, the video frames and the patch information can be different sizes.

The patch information 532, in addition to the elements described above, can include one or more flags, one or more additional syntax elements, one or more quantization parameter size, one or more thresholds, or any combination thereof.

In certain embodiments, a geometry smoothing engine (not shown) can smooth the geometry frames 516, or the reconstructed geometry frames 524b and generate geometry smoothing parameters. Similarly, an attribute smoothing engine (not shown) can smooth the attribute frames 516520 and generate attribute smoothing parameters. The smoothing parameters can be utilized by the decoder 550 for improving the visual quality of the reconstructed point cloud.

The multiplexer 538 combines the patch information sub-bitstream 534a, the geometry sub-bitstream 524a, the occupancy map sub-bitstream 526a, the attribute sub-bitstream 530, and any smoothing parameters (such as the geometry smoothing parameters and the attribute smoothing parameters), to create the bitstream 540.

Generally, the decoder 550, of FIGS. 5A and 5C, receives a bitstream (such as the bitstream 540) that represents media content, such as a point cloud. The bitstream 540 can include data representing a 3D point cloud. In certain embodiments, the decoder 550 can decode the bitstream 540 and generate multiple frames such as one or more geometry frames, one or more attribute frames, and one or more occupancy map frames. The decoder 550 reconstructs the point cloud or a portion of the point cloud using the multiple frames, which can be rendered and viewed by a user.

As illustrated in FIG. 5C, the decoder 550 that includes a demultiplexer 552, one or more decoding engines (such as a decoding engine 554a, a decoding engine 554b, a decoding engine 554c, and a decoding engine 554d), a geometry and attribute reconstruction engine 556, smoothing engines (such as a geometry smoothing engine 558a and an attribute smoothing 558b), and an attribute transfer engine 560.

The decoder 550 receives a bitstream 540, such as the bitstream that was generated by the encoder 510. The demultiplexer 552 separates bitstream 540 into one or more sub-bitstreams representing the different information. For example, the demultiplexer 552 separates various streams of data such into the individual sub-bitstreams such as the parameters sets and messages 536b (which can include the syntax element, geometry smoothing parameters, and attribute smoothing parameters), the geometry sub-bitstream 524a, the occupancy map sub-bitstream 526a, the attribute sub-bitstream 530, and the patch information sub-bitstream 534b. In certain embodiments, the geometry smoothing parameters and the attribute smoothing parameters are not included in the bitstream if the encoder 510 did not perform smoothing.

The decoder 550 includes one or more decoding engines. For example, the decoder 550 can include the decoding engine 554a, a decoding engine 554b, a decoding engine 554c, and a decoding engine 554d (collectively referred to as the decoding engines 554). In certain embodiments, a single decoding engine performs the operations of all of the individual decoding engines 554.

In certain embodiments, the parameter sets and messages 536 provides smoothing parameters from any smoothing engine of the encoder 510. For example, the parameter sets and messages 536 provides geometry smoothing parameters to the geometry smoothing engine 558a. Similarly, the parameter sets and messages 536 provides attribute smoothing parameters to the attribute smoothing engine 558b.

The decoding engine 554a decodes the geometry sub-bitstream 524a into reconstructed geometry 516a. Similarly, the decoding engine 554b decodes the occupancy map sub-bitstream 526a into reconstructed occupancy map frames 518a. Additionally, the decoding engine 554c decodes the attribute sub-bitstream 530 into reconstructed attribute 520a. The decoding engine 554d decodes the patch information sub-bitstream 534a into reconstructed patch information 532a. In certain embodiments, if the patch information 532 of FIG. 5B was not encoded, then demultiplexer 552 separates the patch information 532 from the bitstream (instead of the patch information sub-bitstream 534a) and the patch information 532 are not decoded by the decoding engine 554d.

After a portion of the reconstructed geometry 516a, and a portion of the reconstructed occupancy map frames 518a, a portion of the reconstructed attribute 520a, and a portion of the reconstructed patch information 532a, are decoded, the geometry and attribute reconstruction engine 556 generates a reconstructed point cloud. As discussed above, the portion of the decoded frames can be the entirety of the frames or less. In certain embodiments, the parameter sets and messages 536b can provide various flags, syntax elements, messages, and the like to the geometry and attribute reconstruction engine 556 for reconstructs the points of the point cloud in 3D space. The geometry and attribute reconstruction engine 556 reconstructs the points of the point cloud in 3D space, based on the reconstructed occupancy map frames 518a, the reconstructed geometry 516a, the reconstructed attribute 520a, the reconstructed patch information 532a and any received information from the parameter sets and messages 536b.

The geometry smoothing engine 558a can be enabled or disabled. If the geometry smoothing engine 558a is enabled, then the geometry smoothing engine 558a performs smoothing to the geometry points of the reconstructed point cloud. The geometry smoothing engine 558a can use a geometry smoothing parameter provided by the parameter sets and messages 536b. If the geometry smoothing engine 558a is disabled, then the decoder 550 does not perform geometry smoothing.

In certain embodiments, the decoder 550, via the attribute transfer engine 560, performs attribute transfer step. The attribute transfer engine 560 modifies the attribute information to match the locations of the points in 3D space.

The attribute smoothing engine 558b can be enabled or disabled. If the attribute smoothing engine 558b is enabled, then the attribute smoothing engine 558b performs smoothing to the attribute points of the reconstructed point cloud. The attribute smoothing engine 558b can use an attribute smoothing parameter provided by the parameter sets and messages 536b. In this case, if attribute smoothing is enabled, the attribute smoothing engine 558b smooths the reconstructed attributes based on one or more attribute smoothing parameter. Thereafter the decoder reconstructs the point cloud 562 for rendering. If attribute smoothing is disabled (the decoder 550 can skip the attribute smoothing engine 558b), the reconstructed attributes are directly used to reconstruct point cloud 562 for rendering.

Although FIG. 5A illustrate the environment-architecture 500, FIG. 5B illustrates the encoder 510, and FIG. 5C illustrates the decoder 550, various changes can be made to FIGS. 5A, 5B, and 5C. For example, any number of encoders or decoders can be included environment-architecture 500.

Figure 6A:
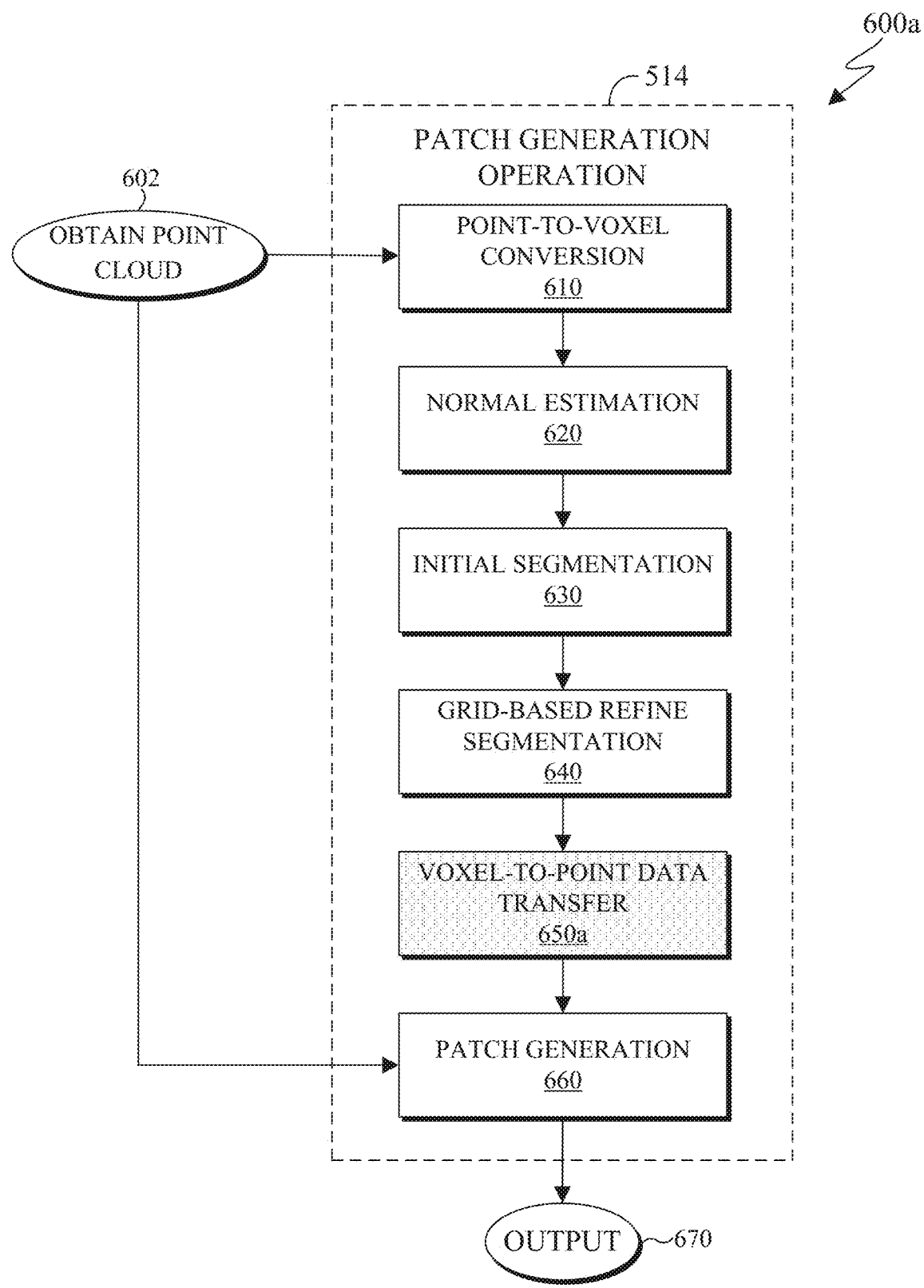
FIGS. 6A and 6B illustrate example methods for generating patches in accordance with an embodiment of this disclosure.
Figure 6B:
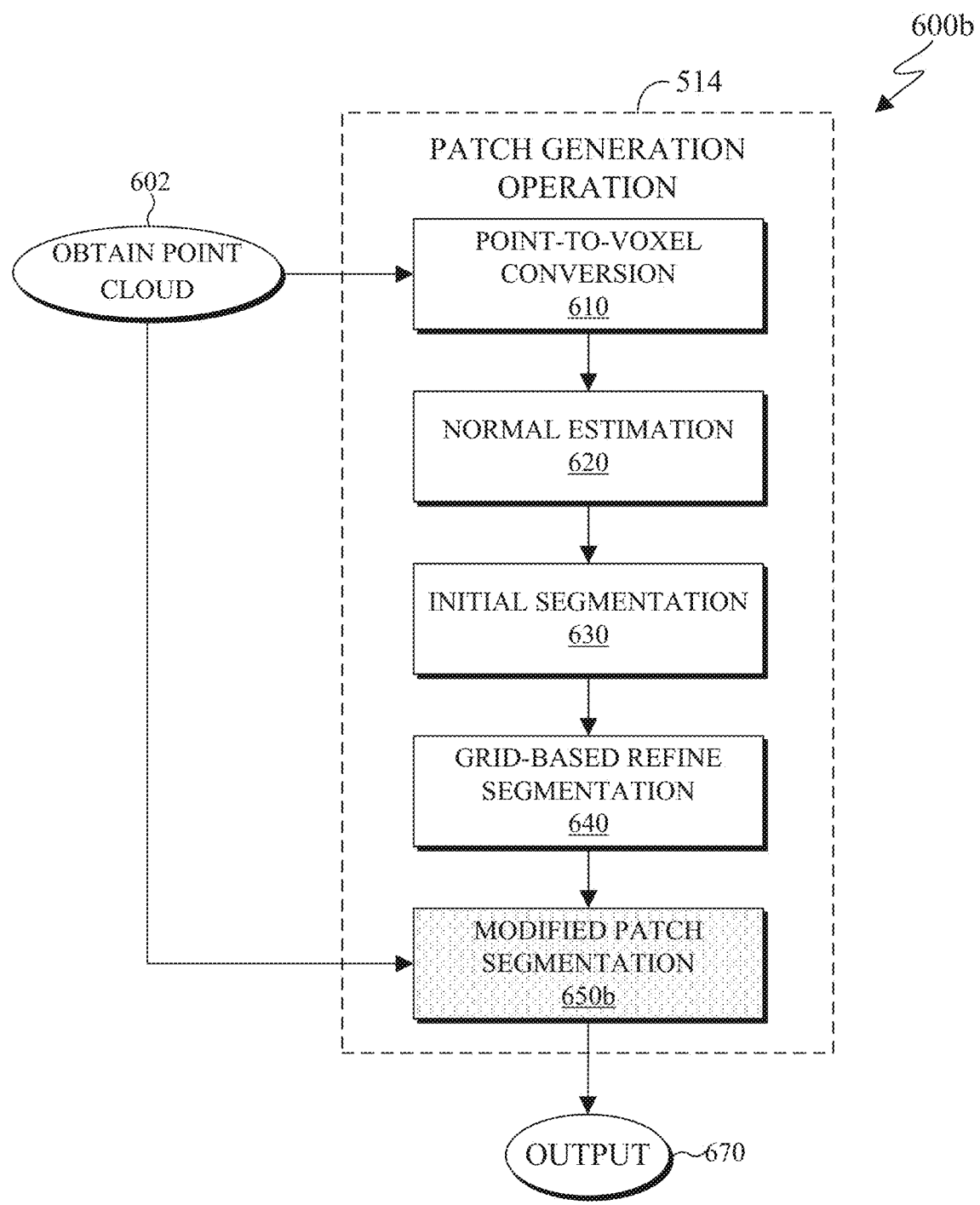
Figure 7:
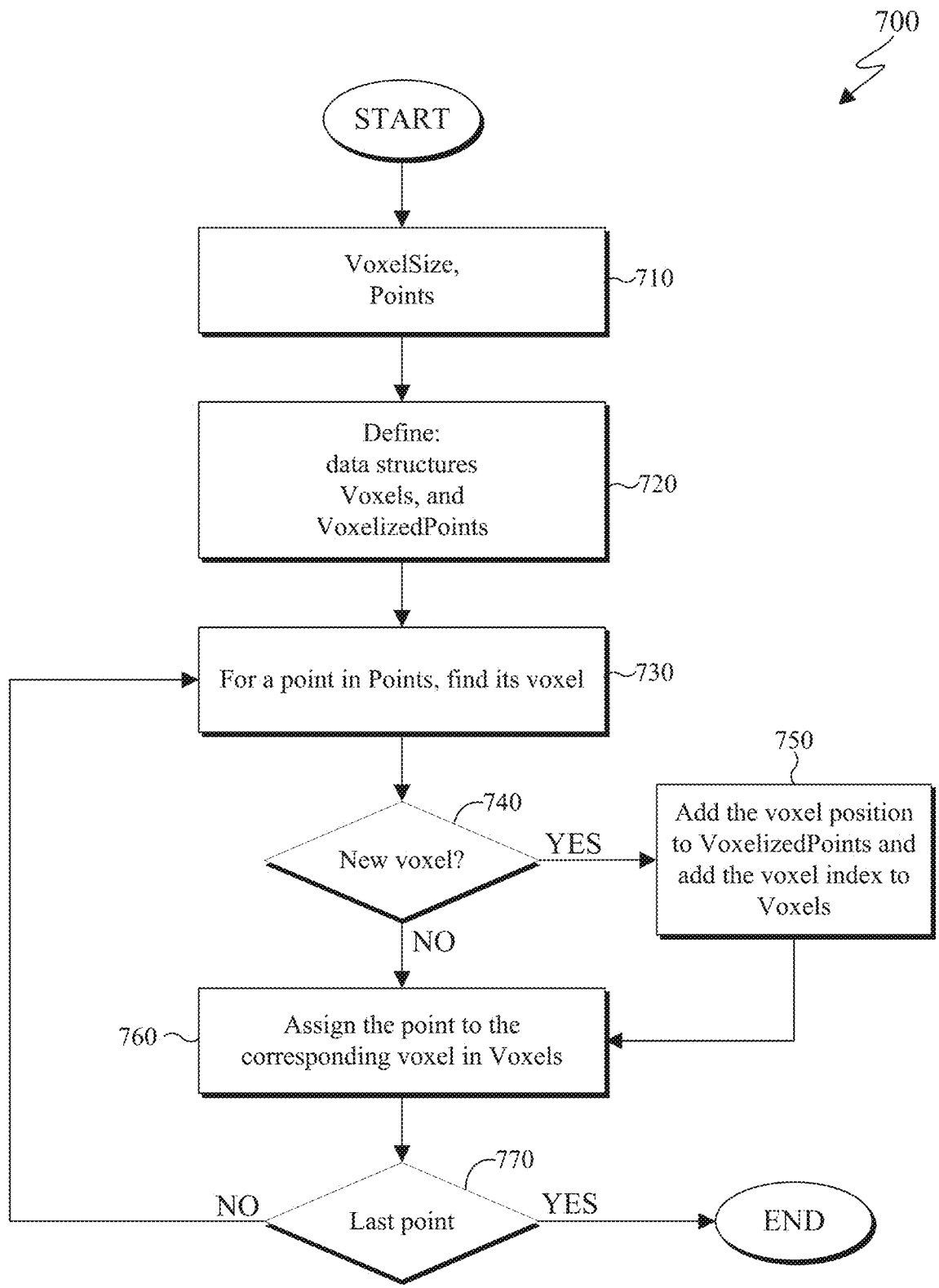
FIG. 7 illustrates an example method for converting points to voxels in accordance with an embodiment of this disclosure.

FIGS. 6A and 6B illustrate example methods 600a and 600b for generating patches in accordance with an embodiment of this disclosure. In particular, the method 600a of FIG. 6A describes a partially applied GBS process while the method 600b of FIG. 6B describes an entirely applied GBS process.

The methods 600a and 600b can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the methods 600a and 600b are described as being performed by the encoder 510 of FIGS. 5A and 5B.

As illustrated in FIGS. 6A and 6B, in step 602, the encoder 510 obtains a point cloud, such as the point cloud 512 of FIG. 5B. For example, the encoder 510 loads a point cloud from another a memory or receives a point cloud form a server. In step 610, the encoder 510 converts points of the input point cloud 512 into voxels. The size of the voxels can be predefined. The output of the step 610 is a voxelized point cloud. Voxelization can be based on down sampling, downscaling, or a combination thereof. For example, the point-to-voxel conversion of step 610 is described in greater detail in FIG. 7 below.

In certain embodiments, a data structure called VoxelizedPoints is defined to keep the voxel positions (in either the point domain or the voxel domain depending on the voxelization strategy). Additionally, another data structure called Voxels is defined to keep the indices of input points inside each voxel to make it possible to transfer the segmentation data from the voxel domain back to the point domain later.

Syntax (1) describes the point to voxel conversion of step 610.

Syntax (1)
```
void PCCPatchSegmenter3::generate VoxeledPointcloud
    (const PCCPointSet3 &source,
    size_t geoBits, size_t voxDim, PCCPointSet3 &source
        Vox,
    std::unordered_map<size_t,                std::::
        vector<size_t>>&voxels)
{
    const size_t geoBits2=geoBits<<1;
    size_t voxDimShift=0;
    for (size_t i=voxDim; i>1; ++voxDimShift, i>>=1) {;}
    const size_t voxDimHalf=voxDim>>1;
    auto subToInd=[&](size_t x, size_t y, size_t z) {
        return x+(y<<geoBits)+(z<<geoBits2);
    };
    for (size_t i=0; i<source.getPointCount( )++i) {
        const auto& pos=source[i];
        const    auto    x0=(static_cast<ull>(pos[0])+
            voxDimHalf)>>voxDimShift;
        const    auto    y0=(static_cast<ull>(pos[1])+
            voxDimHalf)>>voxDimShift;
        const    auto    z0=(static_cast<ull>(pos[2])+
            voxDimHalf)>>voxDimShift;
        const auto p=subToInd(x0, y0, z0);
        if (voxels.count(p)==0u) {
            voxels[p].reserve(32);
            const size_t j=source Vox.addPoint(PCCPoint3D
                (x0, y0, z0));
            source Vox.addColors( )
            source Vox.setColor(j, source.getColor(i));
        }
        voxels[p].push_back(i);
    }
}
```

In step 620, the encoder 510 estimates the normal vector of each voxel. The normal vector is perpendicular to the surface of the point cloud. a In step 630, encoder 510 initially segments the point cloud based on relating the normal vectors of the voxels to the projection planes. For example, if there are six projection planes (such as illustrated in FIG. 4B) then a voxel is assigned to one of the projection planes based on the proximity of the normal vector of that voxel to a normal vector of that projection plane.

In step 640, encoder 510 refines the initial segmentation of step 630. For example, the patch generator and packer 514 smooths out the partitioning of the voxels over the surface of the point cloud. Since the initially segmentation of step 630 can create noise, the patch generator and packer 514 in step 640, smooths the point cloud. The encoder generates partition numbers, corresponding to indices of the projection planes, assigned to each voxel.

In step 650*a* (of FIG. 6A), the encoder 510 performs the partially applied GBS by applying the processing results of voxels (steps 620, 630, and 640) to the points represented by the voxels by allocating the estimated normal vector and the partitioning result (the projection plane assigned to each voxel) of each voxel to all points inside the voxel.

The partition number and the normal vector of each voxel is assigned to the points inside each respective voxel. For example, if there are three points within a voxel, then the partition number and the normal vector of that voxel are assigned to those three points. Syntax (2) below describes the voxel-to point data transfer of step 650*a*. Additionally, FIG. 8A describes step 650*a* in greater detail.

Syntax (2)

```
void    PCCPatchSegmenter3::Transfer    VoxelToPoint
    (size_t pointCount, size_t geoBits,
    size_t voxDim, std::unordered_map<size_t, std::
        vector<ull>>&voxels,
    const PCCPointSet3 & source Vox, PCCNormalsGen-
        erator3 &normalsGen,
    std::vector<size_t>&partitions)
{
    std::vector<size_t>partitionsTmp(pointCount);
    std::vector<PCCVector3D>normalsTmp(pointCount);
    auto &normals=normalsGen.getNormals( )
    const size_t geoBits2=geoBits<<1;
    size_t voxDimShift=0;
    for (size_t i=voxDim; i>1; ++voxDimShift, i>>=1) {;}
    const size_t voxDimHalf=voxDim>>1;
    auto subToInd=[&](const PCCPoint3D &point) {
        return (size_t)point[0]+
            ((size_t)point[1]<<geoBits)+
            ((size_t)point[2]<<geoBits2);
    };
    for (size_t i=0; i<source Vox.getPointCount( ) i++) {
        const auto &partition=partitions[i];
        const auto &normal=normals[i];
        const auto &pos=source Vox[i];
        auto pos(source Vox[i]);
        for (size_t c=0; c<3; c++) {
            pos[c]=(pos[c]+voxDimHalf)>>voxDimShift;
        }
        const auto &indices=voxels[subToInd(pos)];
        for (const auto &index:indices) {
            partitionsTmp[index]=partition;
            normalsTmp[index]=normal;
        }
    }
    swap(partitions, partitionsTmp);
    swap(normalsGen.getNormals( ) normalsTmp);
}
```

In step 660, the encoder 510 generates the 2D patches that represent the 3D point cloud. Once the patches are generated, based on the information of the voxels that are passed to their corresponding points, the rest of the encoding process is performed.

The partial GBS method, as described in FIG. 6A reduces the complexity of the normal estimation (step 620), the initial segmentation (step 630), and the refine segmentation (step 640) since these are performed on a number of voxels representing a larger number of points.

In step 650*b* (of FIG. 6B), the encoder 510 performs entirely applied GBS by applying GBS to the entire patch generation process including the patch generation of step 660 of FIG. 6A. As illustrated in FIG. 6B, the patch segmentation step is performed using both the voxelized point cloud and the input point cloud. In the modified patch generation process of step 650*b*, the voxelized point cloud is used to find and modify connected components (CCs). Then for each CC, a patch is created using the input points inside the voxels that belong to the CC. Next, the patch parameters are estimated from the input points assigned to the patches. This process continues until there are no more points unassigned to any of the CCs. FIG. 8B, describes the entirely applied GBS process in greater detail.

Although FIGS. 6A and 6B illustrates example of a methods 600*a* and 600*b* for generating patches representing a 3D point cloud, various changes may be made to FIGS. 6A and 6B. For example, while shown as a series of steps, various steps in FIGS. 6A and 6B could overlap, occur in parallel, or occur any number of times.

FIG. 7 illustrates an example method 700 for converting points to voxels in accordance with an embodiment of this disclosure. In certain embodiments, method 700 describes the process to voxelize the point cloud 512 using point to voxel conversion of step 620 of FIGS. 6A and 6B and described in Syntax (1) above.

The method 700 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 700 is described as being performed by the encoder 510 of FIGS. 5A and 5B.

In step 710, the encoder 510 identifies two data structures, denoted as VoxelSize and Points. The data structure, VoxelSize, is the size of the voxel. If the voxel size is uniform, then this number is the same. Alternatively, if the voxel is changes throughout the area that includes the point cloud (such as based on point density of the point cloud), then each voxel index is associated with a value corresponding to the size of the voxel. The Points dataset is a set of data that includes the geometry values (such as X, Y, Z) of the points of the original point cloud.

In step 720, the encoder 510 defines two data structures, denoted as Voxels and VoxelizedPoints. The data structure Voxels is an index and corresponding position of each voxel. The data structure Voxels is defined to keep the indices of input points inside each voxel to make it possible to transfer the segmentation data from the voxel domain back to the point domain later (such as in step 650*a* of FIG. 6A or step 650*b* of FIG. 6B). The data structure VoxelizedPoints relates points of the 3D point cloud 512 to the voxels. The data structure called VoxelizedPoints is defined to keep either the voxel positions (in either the point domain or the voxel domain depending on the voxelization strategy).

In step 730, the encoder 510 selects a point in the data structure Points. The encoder identifies which voxel the selected point is within. For example, based on the location of the selected point in 3D space, the encoder 510 identifies a voxel that occupies the same space. It is noted that multiple points can be associated with a single voxel while a single voxel can include zero or more points.

In step 740, the encoder 510 determines whether the voxel that is associated with the selected point is a new voxel. If the voxel is a new voxel, such that the voxel is not associated any other points, then in step 750, the encoder 510 (i) adds the voxel position to the data structure VoxelizedPoints and (i) adds the voxel index to the data structure Voxel.

In step 760, after updating the data structures VoxelizedPoints and Voxel (in step 750) or after determining that the identified voxel is not a new voxel (it was previously defined in the data structures) the selected point is assigned to the corresponding voxel in the data structure Voxel. That is, the selected point of step 730 is associated with the voxel by including the index number of the point (or the geometry of the point) to the index of the voxel in the data structure Voxel.

In step 770, the encoder 510 determines whether the selected point of step 730 was the last point of the point cloud 512. Upon determining that the selected point was not the last point, then the encoder returns to step 730 and selects another point. The process continues until the last point is selected and associated with a voxel. Thereafter, the methods 600a and 600b of FIGS. 6A and 6B proceed to step 620, as described above.

Although FIG. 7 illustrates one example of a method 700 for converting points to voxels, various changes may be made to FIG. 7. For example, while shown as a series of steps, various steps in FIG. 7 could overlap, occur in parallel, or occur any number of times.

Figure 8A:
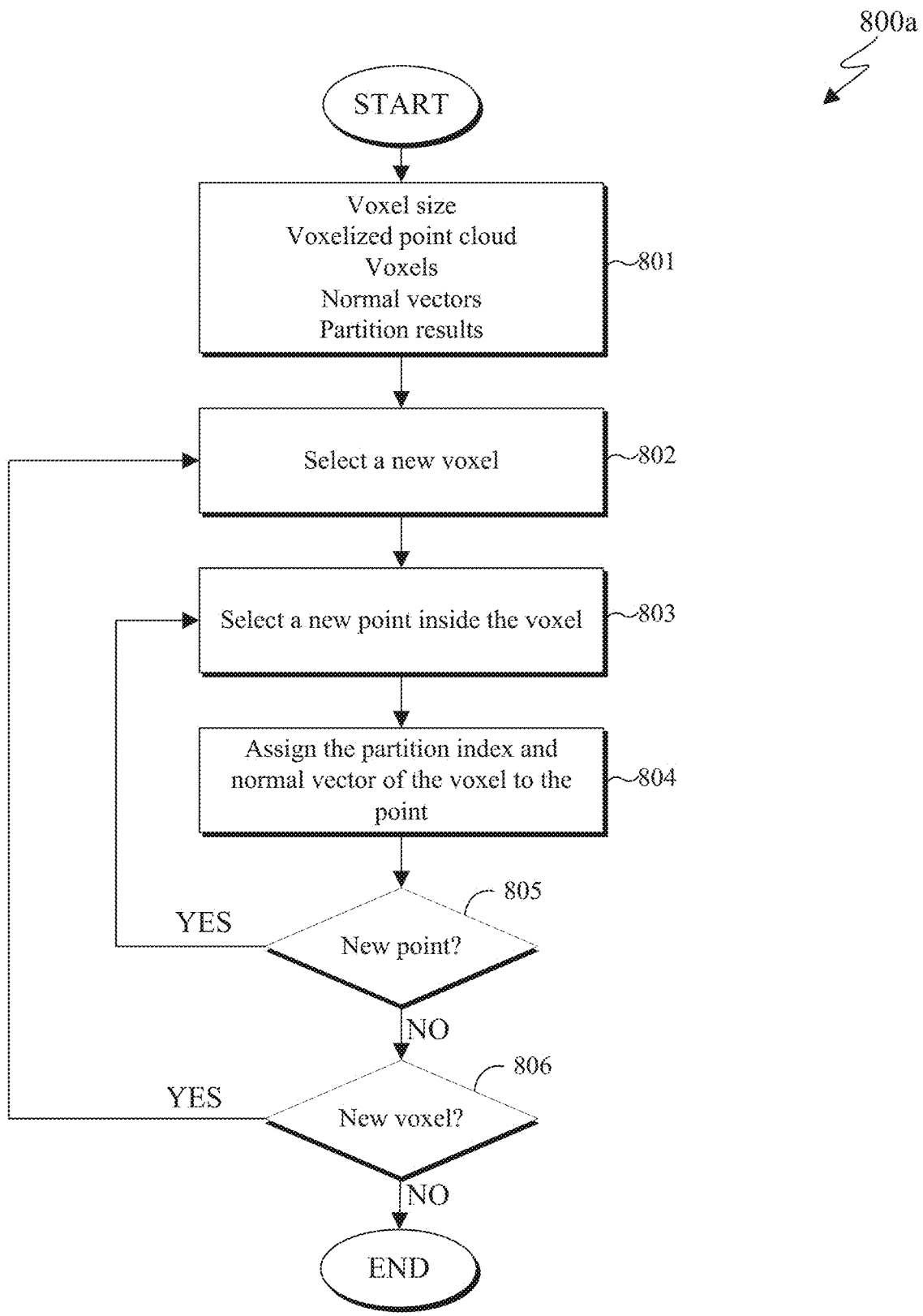
FIGS. 8A, 8B, and 8C illustrate example methods for generating patches in accordance with an embodiment of this disclosure.
Figure 8B:
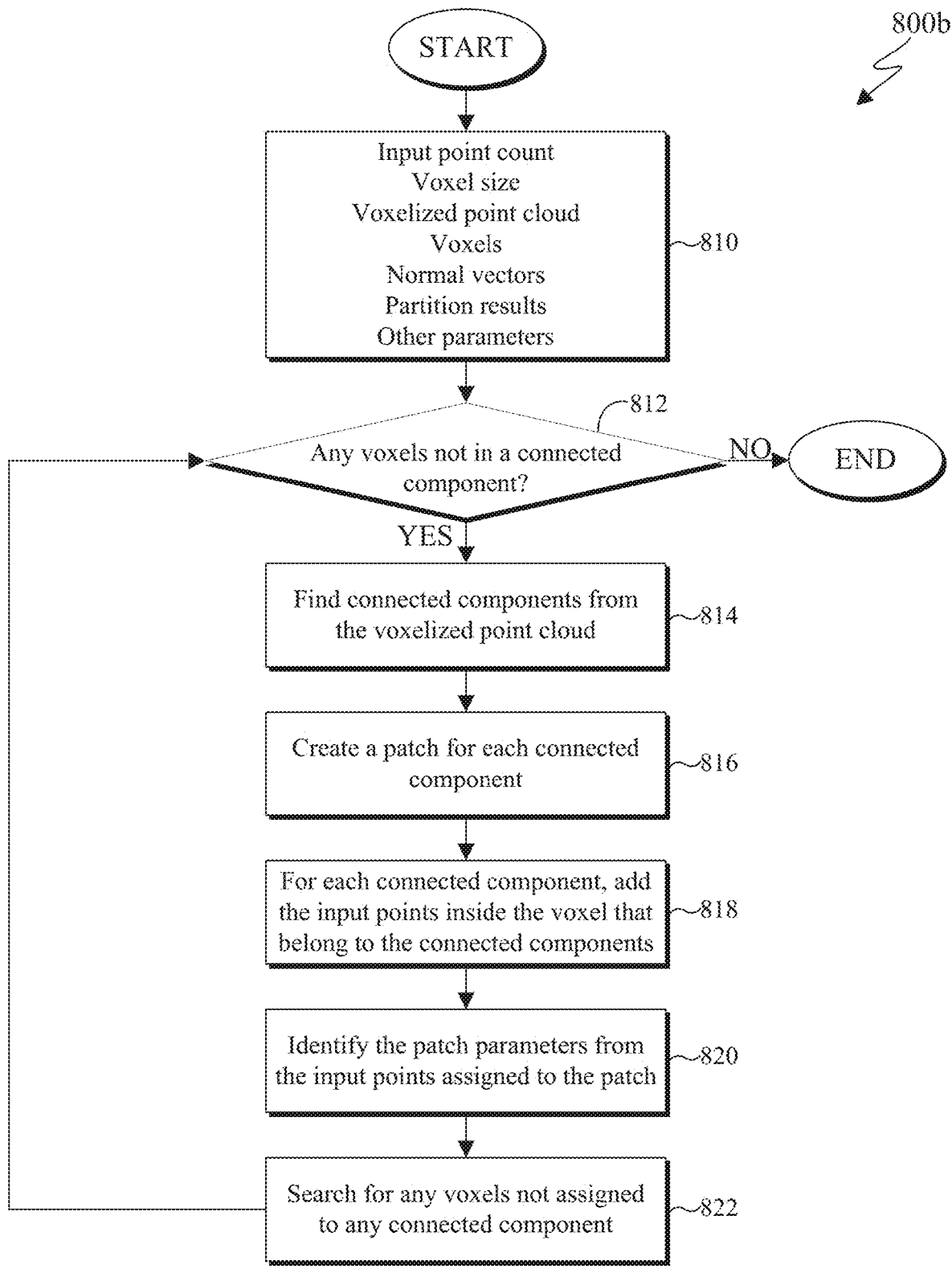
Figure 8C:
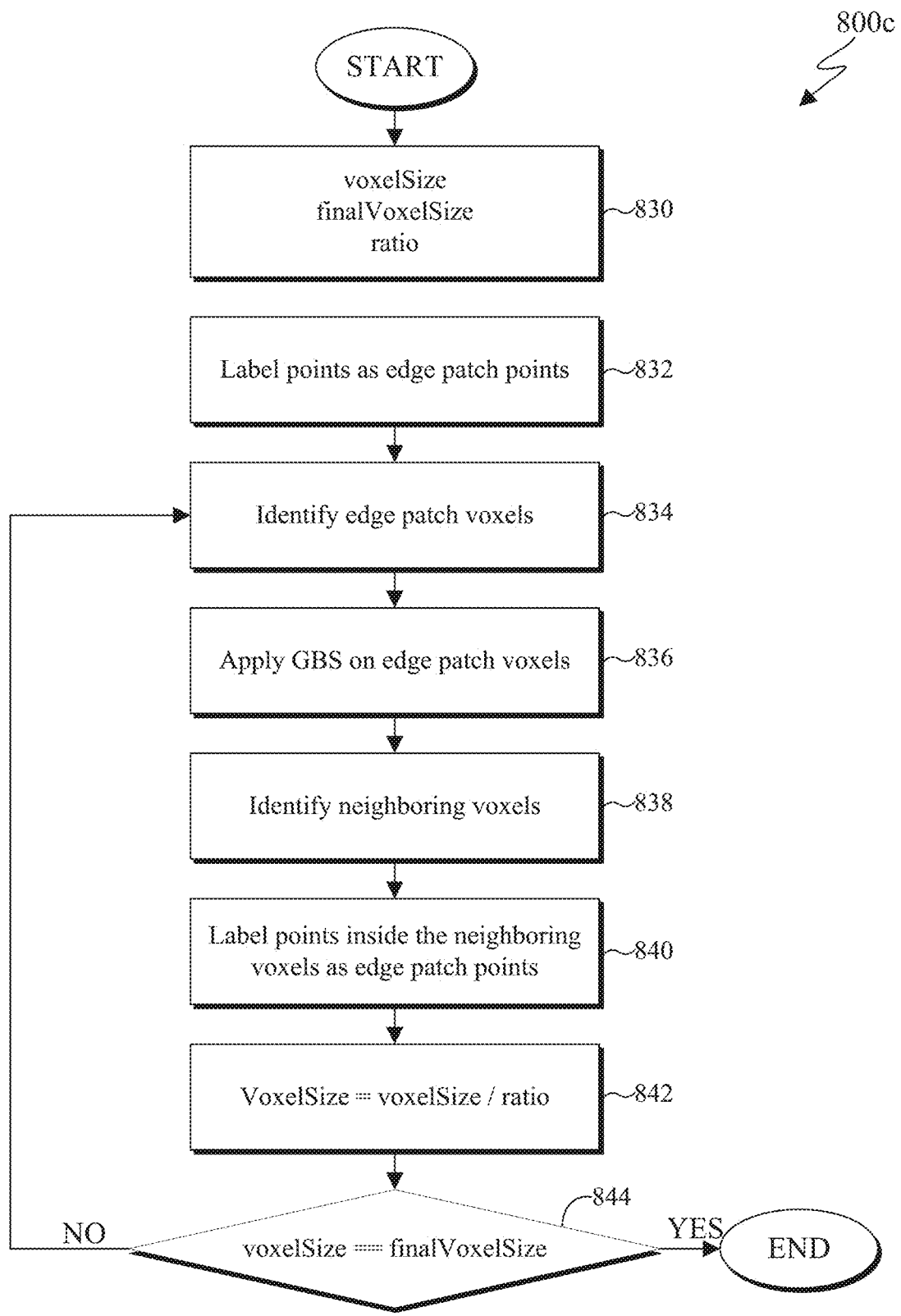

FIGS. 8A, 8B, and 8C illustrate example methods 800a, 800b, and 800c for generating patches in accordance with an embodiment of this disclosure. The method 800a of FIG. 8A describes the step 650a of FIG. 6A for the partially applied GBS. The method 800b of FIG. 8B describes the step 650B of FIG. 6B for the entirely applied GBS. The method 800c describes a multi-resolution GBS.

The methods 800a, 800b, and 800c can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the methods 800a, 800b, and 800c are described as being performed by the encoder 510 of FIGS. 5A and 5B.

As illustrated in FIG. 8A, the method 800a describes the partially applied GBS of the step 650a of FIG. 6A. Here, the data from the voxels are applied to the points therein. Therefore the method 800a copies the patch information associated with each voxel (such as normal estimation, and partition results) to the points that are represented by the voxel.

In step 801, the encoder 510 identifies the voxel size, the voxelized point cloud, the data structure Voxels (as generated in step 720 of FIG. 7), and patch information associated with each voxel including the normal vectors of each voxel, and the partition results of each voxel. For example, for each voxel of a point cloud the encoder 510 identifies the normal vector and the projection plane assigned to that voxel.

In step 802, the encoder 510 selects a voxel. In step 803, the encoder 510 selects a point within the selected voxel of step 802. In step 804, the encoder assigns the patch information including the partition index and the normal vector (as identified in step 620 of FIGS. 6A and 6B) of the voxel to the selected point. The partition index represents the projection plane that is assigned to the voxel based on the step 630 and 640 of FIGS. 6A and 6B.

In step 805, the encoder 510 determines whether the selected voxel (of step 802) includes any additional points. In response to determining that the selected voxel (of step 802) includes at least one additional point, then the method 800a returns to step 803 and the next point is selected. Alternatively, in response to determining that the selected voxel (of step 802) does not includes any additional point, then in step 806, the encoder 510 determines whether there are any additional voxels. In response to determining that there are additional voxels that have not yet had their patch information assigned to the points therein, the method 800a returns to step 802 and the next voxel is selected. Alternatively, in response to determining that there are no additional voxels, indicates that each point of the point cloud is assigned. Thereafter the method 600a can proceed to step 660.

As illustrated in FIG. 8B, the method 800b describes the modified patch segmentation of step 650B of FIG. 6B which uses the entirely applied GBS process. As discussed above, entirely applied GBS identifies connected components of the voxelized point cloud. The patches of the 2D frames are generated using the points inside the voxels belonging to similar connected components. A connected component represents multiple voxels that are connected to one (a seed) voxel. One or more connected components can be associated with a single point cloud.

The method 800b segments a point cloud based on voxels that are considered connected components rather than the individual points. After identifying connected components of the voxels, the encoder 510 transfers the patch information of the voxels to the points and then continue rest of the patch segmentation using the points.

In step 810, the encoder 510 identifies the input point cloud 512, the voxel size, the voxelized point cloud (as generated in step 610 of FIGS. 6A and 6B), the data structure Voxels (as generated in step 720 of FIG. 7), patch information associated with each voxel including the normal vectors of each voxel, and the partition results of each voxel, and any other parameters. For example, for each voxel of a point cloud the encoder 510 identifies the normal vector and the projection plane assigned to that voxel.

In step 812, the encoder 510 determines whether any voxel of the point cloud is not a connected component. For example, the encoder 510 determines whether every voxel is associated with a connected component. For example, the encoder 510 can inspects each voxel and determines whether the voxel is already assigned to one or more existing connected components. A connected component relates one or more voxels that are connected and share a similar projection plane.

Upon determining that at least one voxel is not in an existing connected component, the encoder 510, in step 814 selects that voxel, which is not in an existing connected component, and either creates a new connected component or links that voxel to an existing connected component. In certain embodiments, the encoder 510 iterates over all voxels of the point cloud to identify voxels that are not associated with an existing connected component. Upon determining that at least one voxel is not in an existing connected component, the encoder 510, in step 814 determines whether the voxel can be included in an existing connected component or whether to create a new connected component with the identified voxel as a seed voxel.

For example, the encoder 510 selects a voxel that is not in any existing connected component. The encoder 510 can determine whether the selected voxel can be included in an existing connected component. Upon determining that the selected voxel cannot be included in an existing connected component, the encoder 510 identifies the selected voxel as a seed voxel. The seed voxel and the voxels that are connected to the seed voxel are identified as a first connected component. Thereafter, if the encoder 510 identifies a subsequent voxel that is not included in the first connected component (or any other connected component) the subsequent voxel, the encoder 510 can determine whether the selected voxel can be included in any existing connected component. Upon determining that the selected voxel cannot be included in any existing connected component, the encoder 510 identifies the selected voxel as a second seed voxel. The second seed voxel and the voxels that are connected to the second seed voxel are identified as a second connected component. The process continues until all voxels of the point cloud are associated with a connected component. That is, the encoder 510 iterates over all voxels of the point cloud to identify voxels that are not associated with an existing connected component.

In step 816, the encoder 510 generates a patch for each connected component. In step 818, the encoder 510, for each patch corresponding to a single connected component, adds the input points from the point cloud 512, to the patch. That is, the points within each of voxels of a connected component as included in the patch.

In step 820, the encoder 510 identifies the patch parameters for the points associated with a patch. For example, the patch information of a voxel that is associated with a patch is transferred to the points associated with the same patch. In step 822, the encoder 510 searches for any additional voxels are not associated to any existing connected components. The method 800b returns to step 812 and determines whether any additional voxels are not associated to any existing connected components. The method 800b ends upon determining all voxels are in an existing connected component, and the remainder of the encoding process, as described above (such as in FIG. 5B) continues.

As illustrated in FIG. 8C, the method 800c describes a multi-resolution GBS. It is noted that the methods 800a and 800b result in a tradeoff between complexity reduction and coding performance. However, the points belonging to patch borders are the points that usually get assigned to the wrong patches to due GBS voxelization. Therefore, the multi-resolution GBS as described in the method 800c improves coding performing by refining the grid iteratively for the patch border points.

The multi-resolution GBS can be used in a multi-resolution framework to improve the coding performance while reducing runtime of the encoder 510. The points belonging to the patch borders may get assigned to the wrong patches due to GBS voxelization. Multi-resolution GBS identifies the patch border points after running GBS and reruns patch segmentation exclusively on them using a finer voxel size (or directly on the input points using a voxel size of one) to improve the segmentation results. For example, the multi-resolution GBS, initially uses a large voxel size (denoted as a coarse grid) and iteratively reduces the size of the grid. The process continues until a predefined voxel size, denoted as FinalVoxelSize is reached. In this way, the majority of points, which are not on the patch borders, are segmented using coarser voxel sizes and so benefit from the GBS speedup. By contrast, the patch border points, which are a small portion of the whole point cloud, are segmented into patches either without GBS voxelization (with a voxel size of one) or using a finer GBS voxel size. The partitioning results of GBS can be used to identify patch border points.

In certain embodiments, all points are labeled as patch border points. Then GBS performs a coarse voxelization using a large voxel size on the patch border points. Next, the partitioning results of GBS are used to identify patch border voxels. In one embodiment, voxels with a different partition than their neighboring voxels are identified as patch border voxels. Then all points inside the patch border voxels are labeled as new patch border points. Next, a smaller voxel size is used to apply GBS again using a finer voxelization on only the newly identified patch border points. This process iterates by decreasing the voxel size at each iteration and applying GBS on the patch border points identified in the previous iteration until a predefined final voxel size is reached. If the final voxel size is one, patch segmentation would be applied without GBS voxelization on the final patch border points.

In step 830, the encoder 510 identifies three elements, VoxelSize, final VoxelSize, and ratio. VoxelSize, is the size of each voxel (which changes after each subsequent iteration), while final VoxelSize is the smallest voxel size after one or more iterations of reducing the size of certain voxels. The ratio indicates an amount that a size of a voxel is reduces for each subsequent iteration.

In step 832, the encoder 510 labels each point of the point cloud 512 as edge patch points (border points). In step 834, the encoder 510 identifies the voxels that as edge patch voxels. For example, any voxel that includes a point that is labeled as an edge patch point is identified as an edge patch voxels. If this is the first iteration, all voxels are identified as edge patch voxels, then some of the voxels are identified as edge patch voxels.

In step 836, the encoder 510 performs GBS on the voxels that are identified as edge patch voxels. For example, during the first iteration, a coarse voxelization using a large voxel size is performed. In step 838 neighboring voxels are identified. In step 840, the encoder 510 labels points inside the neighboring voxels as edge patch points. In step 842, the encoder 510 reduces the size of the voxel based on Equation (8), below.

$$VoxelSize = \frac{VoxelSize}{Ratio} \qquad (8)$$

In step 844, the encoder 510 determines whether the size of the voxel as indicated in voxelSize matches the size of the voxel indicated in Final VoxelSize. When the size of the voxel as indicated in voxelSize does not match the size of the voxel indicated in Final VoxelSize, the method 800c returns to step 834 and the encoder identifies edge patch voxels. Alternatively, when the size of the voxel as indicated in voxelSize matches the size of the voxel indicated in Final VoxelSize method 800c ends and the remainder of the encoding process, as described above (such as in FIG. 5B) continues.

Although FIGS. 8A, 8B, and 8C illustrates example of a methods 800a, 800b, and 800c for generating patches representing a 3D point cloud, various changes may be made to FIGS. 8A, 8B, and 8C. For example, while shown as a series of steps, various steps in FIGS. 8A, 8B, and 8C could overlap, occur in parallel, or occur any number of times.

Figure 9:
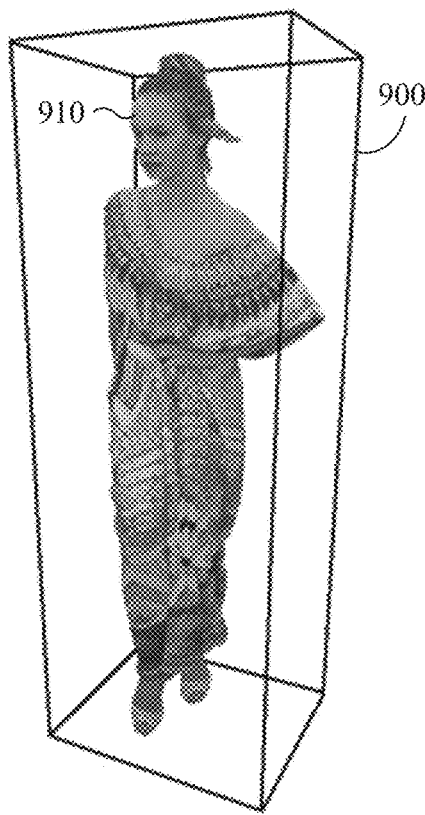
FIG. 9 illustrates a bounding box for a 3D point cloud in accordance with an embodiment of this disclosure.
Figure 10:
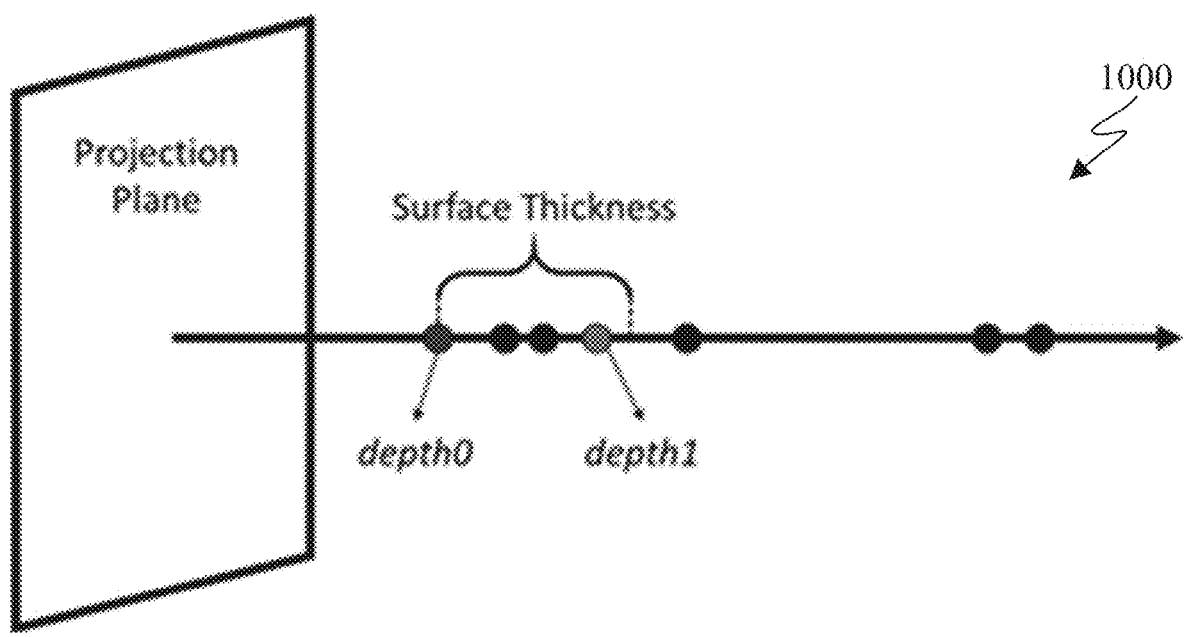
FIG. 10 illustrates a diagram for adding points to containers of a patch in accordance with an embodiment of this disclosure.

FIG. 9 illustrates a bounding box 900 for a 3D point cloud 910 in accordance with an embodiment of this disclosure. FIG. 10 illustrates a diagram 1000 for adding points to containers of a patch in accordance with an embodiment of this disclosure. The process of patch generation can be performed by the server 104, any of the client devices 106-116 of FIG. 1, the server 200 of FIG. 2, the electronic device 300 of FIG. 3, the encoder 510 of FIGS. 5A and 5B, the decoder 550 of FIGS. 5A and 5C, or any other suitable device or system.

In certain embodiments, the direct patch generation approach, generates patches of point cloud without a normal estimation operation can dramatically reduce the complexity of patch generation operation. In certain embodiments, an iterative process is performed, where all points of the point cloud are first tagged as unprojected, and their indices are added to a list (denoted as unProjected list). The list keeps the indices of unprojected points. Then at each iteration of the process, some points are partitioned to the projection planes, tagged as projected, and removed from the unProjected list. In lossy encoding, some points may be removed from the unProjected list without being partitioned to a projection plane (such as points between layers in multi-layer coding, scattered points, and the like). The process repeats until all points are either projected or removed from the list without projection.

Embodiments of the present disclosure describes a direct patch generation approach for V-PCC without normal estimation for reducing the complexity of patch generation. Since, the order in which points are projected matters, it would be suitable to first sort the projection planes based on their order of importance for projection. In certain embodiments, a bounding box of the point cloud is computed, and the projection planes are sorted in a descending order based on the areas of the bounding-box sides.

FIG. 9 illustrates an example bounding box 900 surrounding a point cloud 910. The point cloud 910 can be similar to the point cloud 402 and 404 of FIG. 4A and the point cloud 512 of FIG. 5A.

The front-back sides of the bounding box 900 have the largest area, then the left-right sides, and finally, the top-bottom sides. In certain embodiments, the bounding box is calculated once, and the same order is used for all iterations. In other embodiments, the bounding box is re-calculated at each iteration for the remaining points in the list. In yet other embodiments, the projection planes are not sorted or may be sorted based on other criteria different than the bounding box.

As illustrated in FIG. 10, after the encoder 510 selects the projection order, at each iteration, the closest points to each projection plane along the normal axis of the plane are assigned to the patch, and their depth values are stored in depth0[ ] data container. Also, the furthest points to each projection plane along the normal axis of the plane whose depth values are not more than the value of the surfaceThickness parameter away from depth0 are stored in depth1 [ ] data container, as expressed in Equation (9), below. One or several patches are created when the points are projected to each projection plane at each iteration.

$$|depth0[\cdot]-depth1[\cdot]| \leq surfaceThickness \qquad (9)$$

Various parameters can be estimated. For example, normalAxis is the index of the normal axis perpendicular to the projection plane. The coordinate of points along the normal axis is represented as d. For instance, if the normal axis of a patch is the x-axis, d would be the x-coordinate of patch points.

Another parameter, tangentAxis, is the index of the tangent axis. The coordinates of points along the tangent axis is represented as u. For instance, if the tangent axis of a patch is the z-axis, u would be the z-coordinate of patch's points.

Another parameter, bitangentAxis, is the index of the bitangent axis. The coordinates of points along the tangent axis is represented as v. For instance, if the tangent axis of a patch is the y-axis, v would be the y-coordinate of patch's points.

Another parameter, projectionMode can have different values. For example, a value of 0 indicates that projection is performed only to the near field (front plane). A value of 1 indicates that projection to both the near field and the far field (backplane) is performed. So, for six orthogonal projection planes, a value of 0 for projectionMode means projecting only to three orthogonal planes and a value of 1 means projecting to all six planes. In certain embodiments, for three or six orthogonal projection planes, the indices of x, y, and z axes are 0, 1, and 2, respectively Another parameter, viewID, sets the values of normalAxis, tangentAxis, bitangentAxis, projectionMode, and axisOfAdditionalPlane (determines whether there are more projection planes, e.g. 45-degree planes) parameters.

Additional parameters such as sizeU and sizeV, specify the dimensions of the rectangle that is tangent to the patch. If only one patch is created at each iteration for each projection plane, sizeU and sizeV would be equal to the dimensions of the plane's bounding box.

The parameter d1 is the smallest d coordinate of patch points. It is used as a reference to calculate the d coordinate of projected points.

The parameters u1 and v1 are the smallest u and v coordinates of patch points. these parameters are used as reference values to calculate u and v coordinates of projected points.

The parameters depth0 and depth1 are data containers that store the d–d1 values of patch points, which are the d values of points with respect to the d1 reference value. The depth value (d) of a patch point is stored at the location as expressed in Equation (10), below of either depth0 or depth1. In certain embodiments, filtering steps may be applied to reject improper points from getting added to a patch. For instance, the peak (minimum or maximum depth value depending on projecting to the either near or far plane) value of each 16×16 block is calculated and used to reject points within a block whose depth values differ from the peak value by more than a threshold (e.g. 32).

$$(u-u1)+sizeU \times (v-v1) \qquad (10)$$

In certain embodiments, other patch parameters may also be calculated to improve the segmentation quality.

Figure 11:
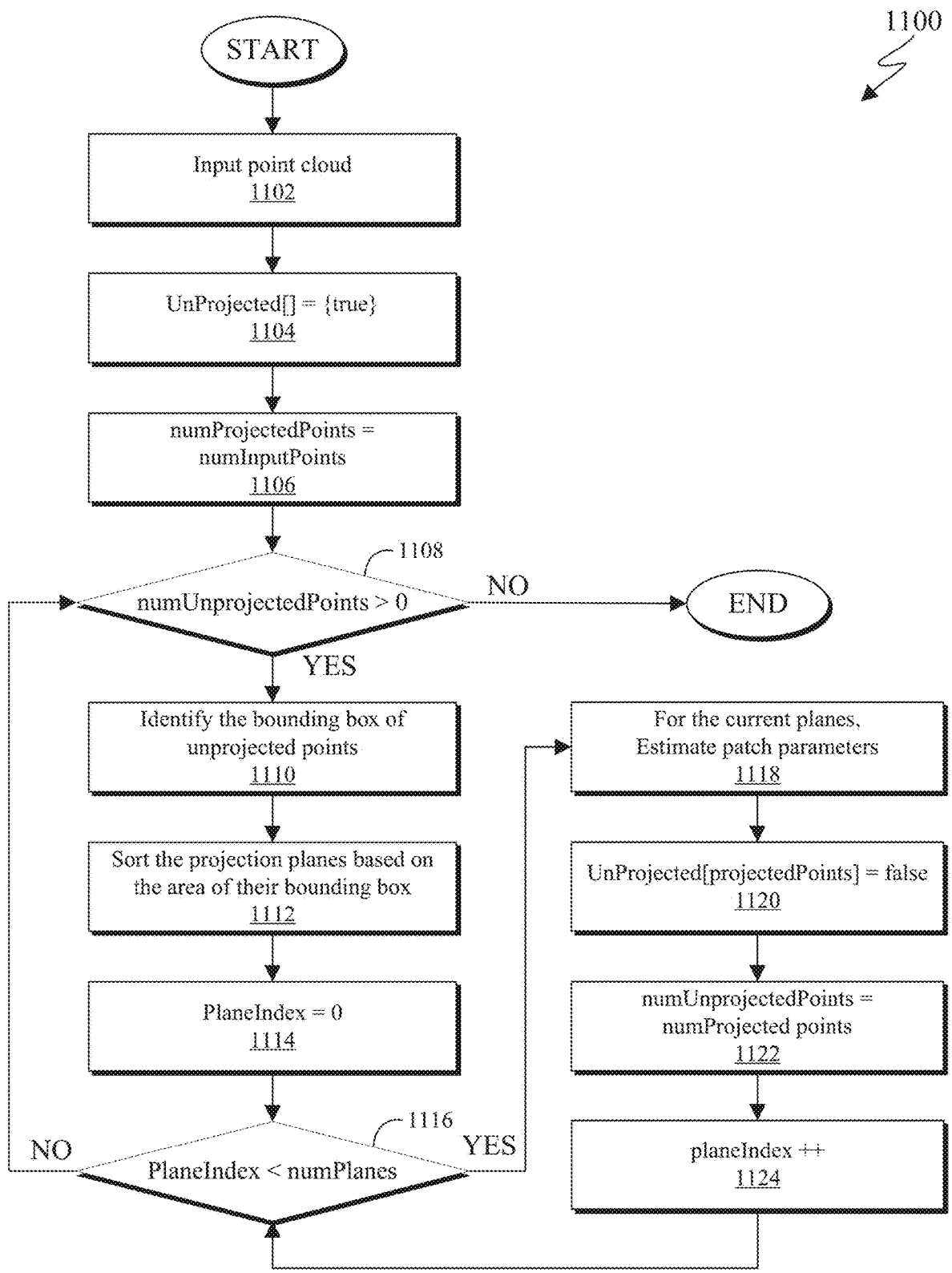
FIG. 11 illustrates a method for generating patches in accordance with an embodiment of this disclosure.

FIG. 11 illustrates a method 1100 for generating patches in accordance with an embodiment of this disclosure. The method 1100 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 1100 is described as being performed by the encoder 510 of FIGS. 5A and 5B.

In step 1102, the encoder 510 obtains an input point cloud. The input point cloud can be similar to any of the point clouds of FIG. 4A, the point cloud 512 of FIG. 5B, or the point cloud 910 of FIG. 9.

In step 1104, the encoder 510 generates a list denoted as unProjected. The list unProjected is sized to match the number of points of the point cloud. The list keeps take of the projected points. At first, all elements of the unProjected list are set to true indicating that that all points are unprojected. The number of unprojected points is set to the number of input points.

In step 1106, the parameter numProjectedPoints is set to the number of input points, denoted as numInputPoints. In step 1108, the encoder 510 determines whether the numProjectedPoints is greater than 0.

In response to determining that the numProjectedPoints is greater than 0, the encoder 510 in step 1110 identifies a bounding box for the unprojected points. In step 1112, the encoder 510 sorts the projection planes based on areas of their bounding box. For example, to project as much point as possible each time, at each iteration of the process, the bounding box for the remaining unprojected points are calculated and used to sort the projection planes based on their projection area. In another embodiment, the number of minimum depth that can be projected on each plane is used to sort the projection planes.

In step 1114, the encoder 510 sets the plane index to zero. In step 1116, the encoder 510 determines whether the plane index (which was initially set to zero in step 1114 or increased in step 1124, described below) is greater than the number of planes, denoted as numPlanes. In response to determining that the plane index is greater than the number of planes, the method 1100 returns to step 1108 for either another iteration or concluding based on the step 1108. If step 1108 determines to end, then the process generating the patches concludes and the process of encoding the frames and generating the bitstream continues.

Alternatively, in response to determining that the plane index is less than the number of planes, then in step 1118, the encoder 510, for the each of the current projection planes, one or several patches are created, and the patch parameters including viewID, sizeU, sizeV, u1, v1, d1, depth0[ ], and depth1[ ] are computed, as explained above.

After the projection on each plane is completed, all projected points as well as all points in each location, as described in Equation (10) whose depth values are between depth0+d1 and depth1+d1 are considered as projected points, and their corresponding values in the unProjected list are set to false (step 1120). Then in step 1122, the number of projected points of the plane is deducted from the total number of unprojected points (defined by variable numUnprojectedPoints). In step 1124, the planeIndex parameter is increased.

This process is continued until numUnprojectedPoints becomes zero (as determined in step 1108). As described above, in a different embodiment, calculating the bounding box and sorting the projection planes can be done only once before the loop on the number of unprojected points Although FIG. 11 illustrates one example of a method 1100 for generating patches, various changes may be made to FIG. 11. For example, while shown as a series of steps, various steps in FIG. 11 could overlap, occur in parallel, or occur any number of times.

Figure 12A:
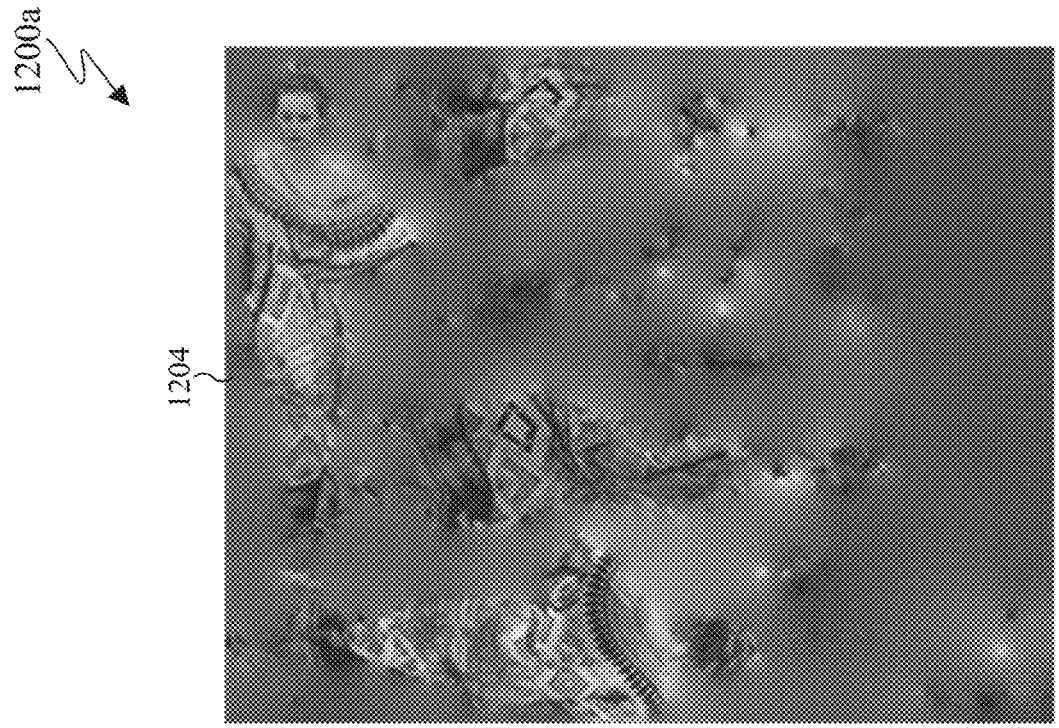
FIGS. 12A and 12B illustrate example frames in accordance with an embodiment of this disclosure.
Figure 12A:
Figure 12B:
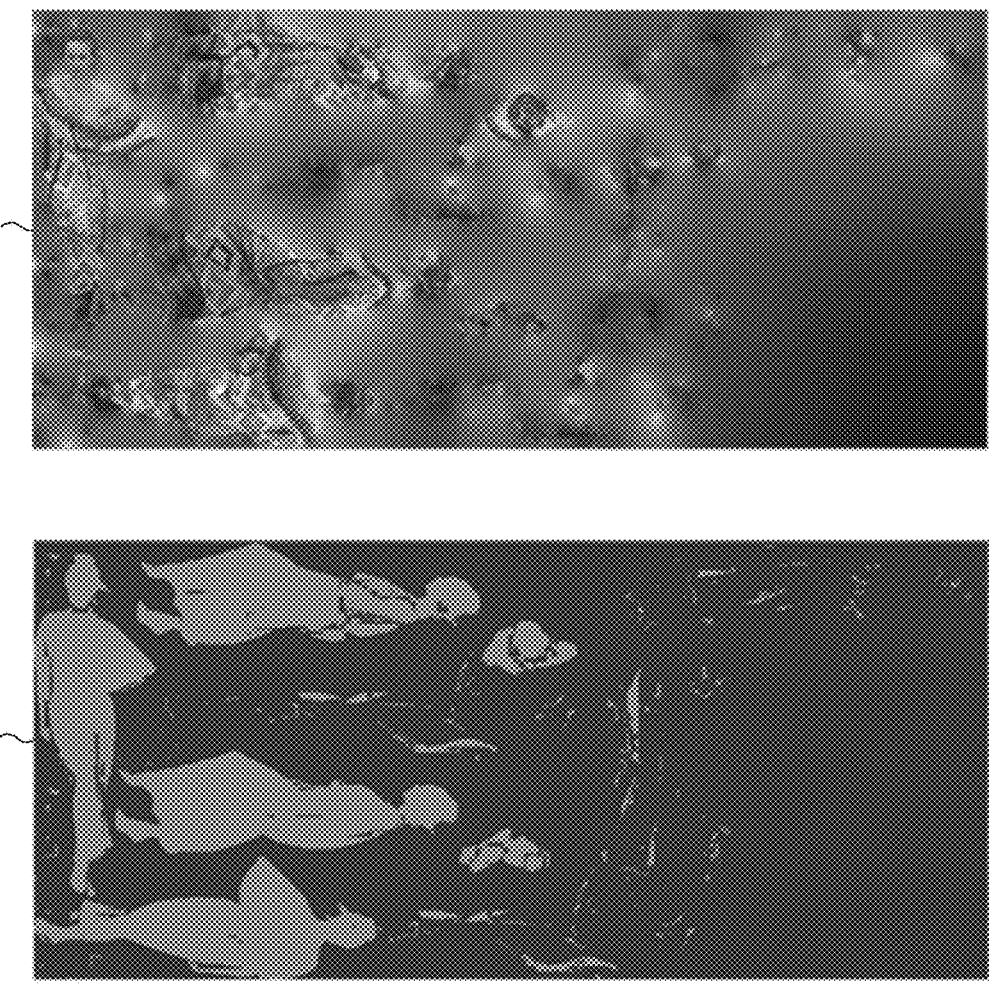

FIGS. 12A and 12B illustrate example frames in accordance with an embodiment of this disclosure. FIG. 12A illustrates example texture frames 1200 with and without padding. For example, texture frame 1202 does not include padding while texture frame 1204 includes padding. The frames 1200 represent frames generated using the direct patch generation as described in the method 1100. Syntax (3) below, describes that at each iteration, the bounding box of the unprojected points is calculated and used to sort the planes based on their projection area. Also, the projected points are removed right after being projected to each plane.

```
SYNTAX                                                              (3)
void PCCPatchSegmenter3::compute(
        const PCCPointSet3&                       geometry,
        const size_t                              frameIndex,
        const PCCPatchSegmenter3Parameters&       params,
        std::vector<PCCPatch>&                    patches,
        std::vector<PCCPointSet3>&                subPointCloud,
        float&                                    distanceSrcRec ) {
    // Project points to the planes.
    const size_t pointCount = geometry.getPointCount( );
    const size_t surfaceThickness = params.surfaceThickness_;
    const size_t maxAllowedDepth = params.maxAllowedDepth _;
    const size_t occupancyResolution = params.occupancyResolution_;
    const auto &points = geometry.getPositions( );
    std::vector<bool> isUnprojected(pointCount, true);
    size_t rawPointCount = pointCount;
    size_t patchIndex = 0;
    while (rawPointCount > 0) {
     // Compute bounding box.
     PCCBox3D boundingBox;
     for (size_t c = 0; c < 3; ++c) {
       boundingBox.min_[c] = infiniteDepth, boundingBox.max_[c] = 0;
     }
     for (size_t i = 0; i < pointCount; ++i) {
       if (isUnprojected[i]) {
        const auto &point = geometry[i];
        for (size_t c = 0; c < 3; ++c) {
          if (point[c] < boundingBox.min_[c]) { boundingBox.min_[c] = point[c]; }
          if (point[c] > boundingBox.max_[c]) { boundingBox.max_[c] = point[c]; }
        }
       }
     }
     // Sort plane indices based on the size of boudning box.
     const auto bbWidths = boundingBox.max_ - boundingBox.min_;
     std::vector<double> bbArea = { bbWidths[1] * bbWidths[2], bbWidths[2] *
bbWidths[0], bbWidths[0] * bbWidths[1] };
     std::array<size_t, 3> bbPlanes = { 0,1,2 };
     if (bbArea[1] > bbArea[0]) {
       std::swap(bbArea[0], bbArea[1]);
       std::swap(bbPlanes[0], bbPlanes[1]);
     }
     if (bbArea[2] > bbArea[1]) {
```

```
      std::swap(bbArea[1], bbArea[2]);
      std::swap(bbPlanes[1], bbPlanes[2]);
    }
    if (bbArea[1] > bbArea[0]) {
      std::swap(bbArea[0], bbArea[1]);
      std::swap(bbPlanes[0], bbPlanes[1]);
    }
    for (auto plane : bbPlanes) {
      for (size_t mode = 0; mode < 2; mode++) {
        if (rawPointCount == 0) { break; }
        const int16_t direction = mode == 0 ? 1 : -1;
        patches.push_back(PCCPatch( ));
        auto &patch = patches.back( );
        patch.getIndex( ) = patchIndex;
        patch.setViewId(direction == 1 ? plane : plane + 3);
        const auto normalAxis = patch.getNormalAxis( );
        const auto tangentAxis = patch.getTangentAxis( );
        const auto bitangentAxis = patch.getBitangentAxis( );
        int16_t sizeU = 0, sizeV = 0, sizeU0, sizeV0;
        int16_t u1 = infiniteDepth, v1 = infiniteDepth;
        int16_t d1 = direction == 1 ? infiniteDepth : 0;
        for (size_t i = 0; i < pointCount; ++i) {
          if (isUnprojected[i]) {
            const auto &point = points[i];
            u1 = (std::min)(u1, point[tangentAxis]);
            v1 = (std::min)(v1, point[bitangentAxis]);
            d1 = direction == 1 ? (std::min)(d1, point[normalAxis])
                      : (std::max)(d1, point[normalAxis]);
            sizeU = (std::max)(sizeU, point[tangentAxis]);
            sizeV = (std::max)(sizeV, point[bitangentAxis]);
          }
        }
        patch.getU1( ) = u1;
        patch.getV1( ) = v1;
        patch.getD1( ) = d1;
        patch.getSizeU( ) = sizeU -= u1 - 1;
        patch.getSizeV( ) = sizeV -= v1 - 1;
        patch.getOccupancyResolution( ) = occupancyResolution;
        patch.getSizeU0( ) = sizeU0 = ceil((double)sizeU / occupancyResolution);
        patch.getSizeV0( ) = sizeV0 = ceil((double)sizeV / occupancyResolution);
        auto &depth0 = patch.getDepth(0);
        depth0.resize(sizeU * sizeV, infiniteDepth);
        auto &depth1 = patch.getDepth(1);
        auto &patchOccupancy = patch.getOccupancy( );
        patchOccupancy.resize(sizeU0 * sizeV0, false);
        for (size_t i = 0; i < pointCount; i++) {
          if (isUnprojected[i]) {
            const auto &point = points[i];
            const auto d = point[normalAxis];
            const auto u = point[tangentAxis] - u1;
            const auto v = point[bitangentAxis] - v1;
            const auto p = v * sizeU + u;
            if ((direction == 1 && depth0[p] > d) ||
                (direction == -1 && (depth0[p] == infiniteDepth || depth0[p] < d))) {
              depth0[p] = d;
            }
          }
        }
      }
      // filter depth
      std::vector<int16_t> peakPerBlock;
      peakPerBlock.resize(sizeU0 * sizeV0, direction == 1 ? infiniteDepth : 0);
      for (size_t v = 0; v < sizeV; ++v) {
        for (size_t u = 0; u < sizeU; ++u) {
          const size_t p = v * sizeU + u;
          if (depth0[p] < infiniteDepth) {
            const size_t u0 = u / occupancyResolution;
            const size_t v0 = v / occupancyResolution;
            const size_t p0 = v0 * sizeU0 + u0;
            peakPerBlock[p0] = direction == 1 ? (std::min)(peakPerBlock[p0], depth0[p])
                                : (std::max)(peakPerBlock[p0], depth0[p]);
          }
        }
      }
      for (size_t v = 0; v < sizeV; ++v) {
        for (size_t u = 0; u < sizeU; ++u) {
          const size_t p = v * sizeU + u;
          if (depth0[p] < infiniteDepth) {
            const size_t u0 = u / occupancyResolution;
            const size_t v0 = v / occupancyResolution;
```

```
            const size_t p0 = v0 * sizeU0 + u0;
            if ((std::abs(depth0[p] - peakPerBlock[p0]) > 32) ||
                (std::abs(depth0[p] - d1)> (int16_t)maxAllowedDepth -
(int16_t)surfaceThickness)) {
                depth0[p] = infiniteDepth;
            }
            else { patchOccupancy[p0] = true; }
          }
        }
      }
    }
    depth1 = depth0;
    if (surfaceThickness > 0) {
      for (size_t i = 0; i < pointCount; ++i) {
        if (isUnprojected[i]) {
          const auto &point = points[i];
          const auto d = point[normalAxis];
          const auto u = point[tangentAxis] - u1;
          const auto v = point[bitangentAxis] - v1;
          const auto p = v * sizeU + u;
          if (depth0[p] < infiniteDepth &&
            std::abs(d - depth0[p]) <= surfaceThickness && direction * (d - depth1[p]) > 0)
{
            depth1[p] = d;
          }
        }
      }
    }
    for (size_t i = 0; i < pointCount; i++) {
      if (isUnprojected[i]) {
        const auto &point = points[i];
        const auto d = point[normalAxis];
        const auto u = point[tangentAxis] - u1;
        const auto v = point[bitangentAxis] - v1;
        const auto p = v * sizeU + u;
        if (depth0[p] < infiniteDepth) {
          if (d>= std::min(depth0[p], depth1[p]) && d <= std::max(depth0[p], depth1[p]))
{
            isUnprojected[i] = false;
            rawPointCount--;
          }
        }
      }
    }
    for (size_t i = 0; i < depth0.size( ); ++i) {
      if (depth0[i] < infiniteDepth) {
        if (direction == 1) {
          depth0[i] -= d1;
          depth1[i] -= d1;
        }
        else {
          depth0[i] = d1 - depth0[i];
          depth1[i] = d1 - depth1[i];
        }
      }
    }
    patchIndex++;
    }
   }
  }
 }
}
```

FIG. 12B illustrates an example frames 1200b include an occupancy map 1212 and its corresponding texture frame 1214. The projected points at each iteration are maintained until the projection on all projection planes is complete. Therefore a point may get projected serval times, resulting in a larger number of points in the reconstructed point cloud.

Syntax (4) below, describes the generation of frames as shown in FIG. 12B.

```
Syntax                                                           (4)
void PCCPatchSegmenter3::compute(const PCCPointSet3&      geometry, Q
                                 const size_t             frameIndex,
                                 const PCCPatchSegmenter3Parameters& params,
                                 std::vector<PCCPatch>&   patches,
                                 std::vector<PCCPointSet3>&   subPointCloud,
                                 float&                   distanceSrcRec ) {
  // Project points to the planes.
  const size_t pointCount = geometry.getPointCount( );
  const size_t surfaceThickness = params.surfaceThickness_;
```

```
const size_t maxAllowedDepth = params.maxAllowedDepth_;
const size_t occupancyResolution = params.occupancyResolution_;
const auto &points = geometry.getPositions( );
std::vector<bool> isUnprojected(pointCount, true);
std::vector<size_t> pointToPatch(pointCount, infinitenumber);
size_t rawPointCount = pointCount;
  size_t patchIndex = 0;
  while (rawPointCount > 0) {
    // Compute bounding box.
    PCCBox3D boundingBox;
    for (size_t c = 0; c < 3; ++c) {
      boundingBox.min_[c] = infiniteDepth, boundingBox.max_[c] = 0;
    }
    for (size_t i = 0; i < pointCount; ++i) {
     if (isUnprojected[i]) {
       const auto &point = geometry[i];
       for (size_t c = 0; c < 3; ++c) {
         if (point[c] < boundingBox.min_[c]) { boundingBox.min_[c] = point[c]; }
         if (point[c] > boundingBox.max_[c]) { boundingBox.max_[c] = point[c]; }
       }
      }
     }
    }
    // Sort plane indices based on the size of boudning box.
    const auto bbWidths = boundingBox.max_ - boundingBox.min_;
    std::vector<double> bbArea = { bbWidths[1] * bbWidths[2], bbWidths[2] *
bbWidths[0], bbWidths[0] * bbWidths[1] };
    std::array<size_t, 3> bbPlanes = { 0,1,2 };
    if (bbArea[1] > bbArea[0]) {
    std::swap(bbArea[0], bbArea[1]);
    std::swap(bbPlanes[0], bbPlanes[1]);
  }
  if (bbArea[2] > bbArea[1]) {
    std::swap(bbArea[1], bbArea[2]);
    std::swap(bbPlanes[1], bbPlanes[2]);
  }
  if (bbArea[1] > bbArea[0]) {
    std::swap(bbArea[0], bbArea[1]);
    std::swap(bbPlanes[0], bbPlanes[1]);
  }
  for (auto plane : bbPlanes) {
   for (size_t mode = 0; mode < 2; mode++) {
     if (rawPointCount == 0) { break; }
     const int16_t direction = mode == 0 ? 1 : -1;
     patches.push_back(PCCPatch( ));
     auto &patch = patches.back( );
     patch.getIndex( ) = patchIndex;
     patch.setViewId(direction == 1 ? plane : plane + 3);
     const auto normalAxis = patch.getNormalAxis( );
     const auto tangentAxis = patch.getTangentAxis( );
     const auto bitangentAxis = patch.getBitangentAxis( );
     int16_t sizeU = 0, sizeV = 0, sizeU0, sizeV0;
     int16_t u1 = infiniteDepth, v1 = infiniteDepth;
     int16_t d1 = direction == 1 ? infiniteDepth : 0;
     for (size_t i = 0; i < pointCount; ++i) {
       if (isUnprojected[i]) {
         const auto &point = points[i];
         u1 = (std::min)(u1, point[tangentAxis]);
         v1 = (std::min)(v1, point[bitangentAxis]);
         d1 = direction == 1 ? (std::min)(d1, point[normalAxis])
                : (std::max)(d1, point[normalAxis]);
         sizeU = (std::max)(sizeU, point[tangentAxis]);
         sizeV = (std::max)(sizeV, point[bitangentAxis]);
       }
      }
      patch.getU1( ) = u1;
      patch.getV1( ) = v1;
      patch.getD1( ) = d1;
      patch.getSizeU( ) = sizeU -= u1 - 1;
      patch. getSizeV( ) = sizeV -= v1 - 1;
      patch.getOccupancyResolution( ) = occupancyResolution;
      patch.getSizeU0( ) = sizeU0 = ceil((double)sizeU / occupancyResolution);
      patch.getSizeV0( ) = sizeV0 = ceil((double)sizeV / occupancyResolution);
      auto &depth0 = patch.getDepth(0);
      depth0.resize(sizeU * sizeV, infiniteDepth);
      auto &depth1 = patch.getDepth(1);
      auto &patchOccupancy = patch.getOccupancy( );
      patchOccupancy.resize(sizeU0 * sizeV0, false);
      for (size_t i = 0; i < pointCount; i++) {
        if (isUnprojected[i]) {
```

```
          const auto &point = points[i];
          const auto d = point[normalAxis];
          const auto u = point[tangentAxis] - u1;
          const auto v = point[bitangentAxis] - v1;
          const auto p = v * sizeU + u;
          if ((direction == 1 && depth0[p] > d) ||
             (direction == -1 && (depth0[p] == infiniteDepth || depth0[p] < d))) {
            depth0[p] = d;
          }
        }
      }
    }
    // filter depth
    std::vector<int16_t> peakPerBlock;
    peakPerBlock.resize(sizeU0 * sizeV0, direction == 1 ? infiniteDepth : 0);
    for (size_t v = 0; v < sizeV; ++v) {
      for (size_t u = 0; u < sizeU; ++u) {
        const size_t p = v * sizeU + u;
        if (depth0[p] < infiniteDepth) {
          const size_t u0 = u / occupancyResolution;
          const size_t v0 = v / occupancyResolution;
          const size_t p0 = v0 * sizeU0 + u0;
          peakPerBlock[p0] = direction == 1 ? (std::min)(peakPerBlock[p0], depth0[p])
                                            : (std::max)(peakPerBlock[p0], depth0[p]);
        }
      }
    }
    for (size_t v = 0; v < sizeV; ++v) {
      for (size_t u = 0; u < sizeU; ++u) {
        const size_t p = v * sizeU + u;
        if (depth0[p] < infiniteDepth) {
          const size_t u0 = u / occupancyResolution;
          const size_t v0 = v / occupancyResolution;
          const size_t p0 = v0 * sizeU0 + u0;
          if ((std::abs(depth0[p] - peakPerBlock[p0]) > 32) ||
             (std::abs(depth0[p] - d1) > (int16_t)maxAllowedDepth -
(int16_t)surfaceThickness)) {
            depth0[p] = infiniteDepth;
          }
          else { patchOccupancy [p0] = true; }
        }
      }
    }
    depth1 = depth0;
    if (surfaceThickness > 0) {
      for (size_t i = 0; i < pointCount; ++i) {
        if (isUnprojected[i]) {
          const auto &point = points[i];
          const auto d = point[normalAxis];
          const auto u = point[tangentAxis] - u1;
          const auto v = point[bitangentAxis] - v1;
          const auto p = v * sizeU + u;
          if (depth0[p] < infiniteDepth &&
             std::abs(d - depth0[p]) <= surfaceThickness && direction * (d - depth1[p]) > 0)
{
            depth1[p] = d;
          }
        }
      }
    }
    for (size_t i = 0; i < pointCount; i++) {
      if (isUnprojected[i]) {
        const auto &point = points[i];
        const auto d = point[normalAxis];
        const auto u = point[tangentAxis] - u1;
        const auto v = point[bitangentAxis] - v1;
        const auto p = v * sizeU + u;
        if (depth0[p] < infiniteDepth) {
          if (d >= std::min(depth0[p], depth1[p]) && d <= std::max(depth0[p], depth1[p]))
{
            pointToPatch[i] = patchIndex;
          }
        }
      }
    }
    for (size_t i = 0; i < depth0.size( ); ++i) {
      if (depth0[i] < infiniteDepth) {
        if (direction == 1) {
          depth0[i] -= d1;
          depth1[i] -= d1;
```

```
      }
      else {
        depth0[i] = d1 - depth0[i];
        depth1[i] = d1 - depth1[i];
      }
    }
  }
}
  patchIndex++;
  }
 }
 for (size_t i = 0; i < pointCount; i++) {
   const auto index = pointToPatch[i];
   if (index >= patchIndex - 6 && index < patchIndex) {
     isUnprojected[i] = false;
     rawPointCount--;
   }
  }
 }
}
```

Figure 13:
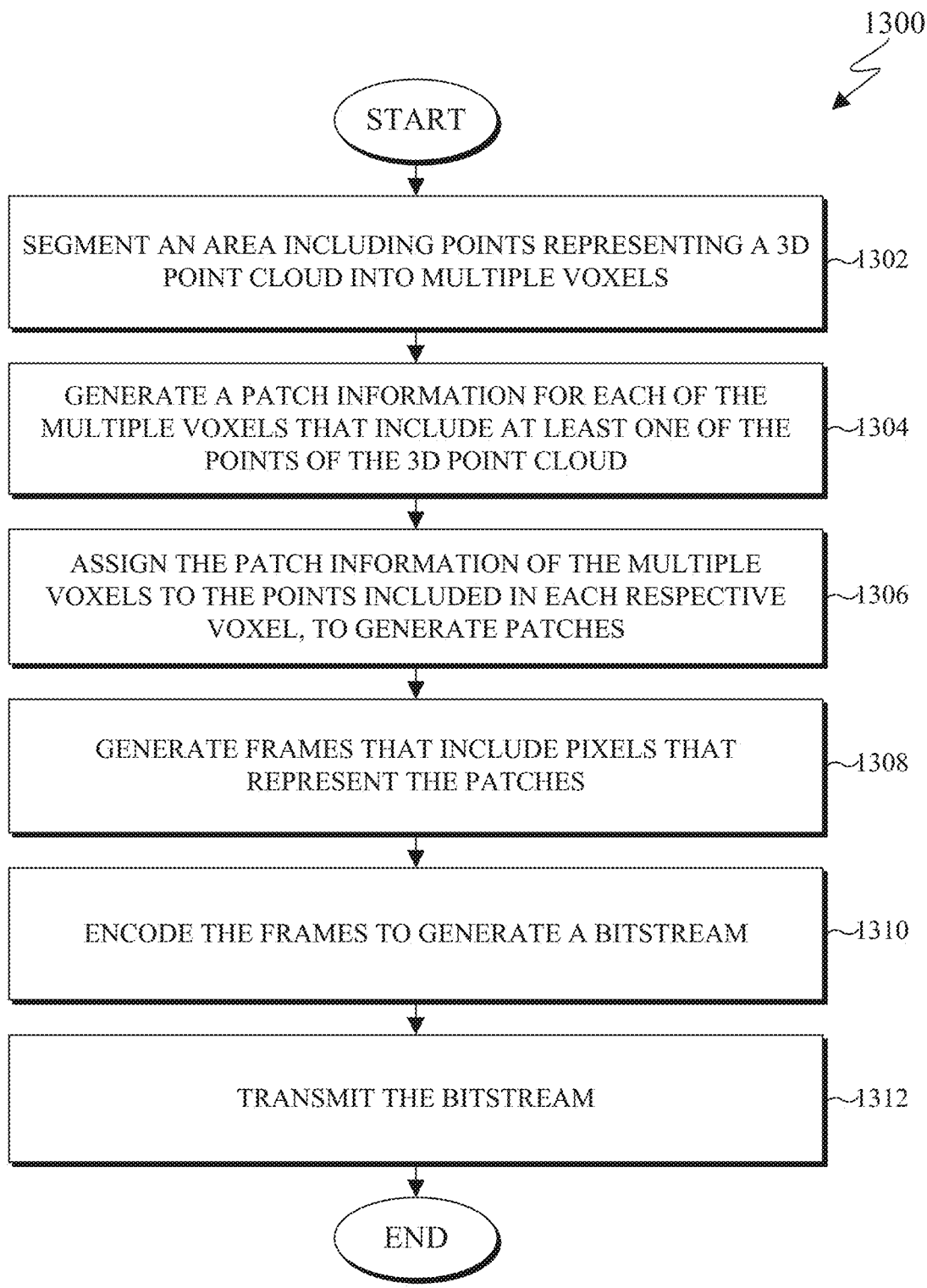
FIG. 13 illustrates a method for encoding a point cloud in accordance with an embodiment of this disclosure.

FIG. 13 illustrates a method 1300 for encoding a point cloud in accordance with an embodiment of this disclosure. The method 1300 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 1300 is described as being performed by the encoder 510 of FIGS. 5A and 5B.

In step 1302, the encoder 510 segments an area including points of the 3D point cloud into multiple voxels. For example, the encoder 510 can partition the area surrounding a point cloud into a grid where each cell of the grid corresponds to a single voxel.

To segment the area into multiple voxels the encoder 510 assigns subsets of points of the point cloud to particular voxels based on the location of each subsets of points and the location of a voxel. After a voxel is associated with a subset of points, the encoder 510 identifies the normal vector of the voxel. In certain embodiments, to identify the normal vector of the voxel, the encoder 510 identifies a center point of the subset of points assigned to the voxel. The center point can by the point that is located closest to the center location of the voxel. In other embodiments, to identify the normal vector of the voxel, the encoder 510 identifies a centroid of the subset of points assigned to the voxel. The centroid can be based on a weighted location of the points in the voxel. The centroid can compare distances between the points and identify a weighted average of the locations of the points within the voxel. By representing the points in the voxel by either the center point or a centroid, maintains the dynamic range of the points while reducing the point density of the point cloud.

In certain embodiments, the encoder 510 segments the area into the multiple voxels of a first size. Thereafter the encoder 510 identifies patch border voxels based on the patch information. The encoder 510 then segments the patch border voxels into voxels of a second size, wherein the second size is smaller than the first size. The encoder 510 can then identify additional patch border voxels based on additional patch information.

In step 1304, the encoder 510 generates patch information associated with each of the voxels that include at least one point of the point cloud. The patch information associated with each of the multiple voxels include a normal vector and a partition number. The normal vector is identified based on either the centroid or center point of a voxel. For example, the normal vector of one of the multiple voxels is perpendicular to an external surface of the 3D point cloud at a location of the voxel (such as the center point or the centroid of the voxel). Based on the direction of the normal vector, a projection plane is assigned to that voxel. In certain embodiments, the encoder 510 also smooths the assigned projection planes of each of the voxels over the surface of the point cloud.

The partition number represents a partitioning plane that is assigned to each voxel. In certain embodiments, the partition number represents indices of the projection planes, assigned to the voxels.

In step 1306, the encoder 510 assigns the patch information of the voxels to the points inside each respective voxel. For example, the partition index (number) and the normal vector of a voxel is assigned to all of the points inside that voxel. Based on the assigned patch information, that is assigned to each point, the encoder generates 2D patches representing the 3D point cloud. For example, the encoder can group the points of the 3D point cloud to one of the multiple projection planes based on the assigned patch information.

In certain embodiments, to generate the patches the encoder 510 identifies a connected component from the area. The connected component representing a first voxel of the multiple voxels and one or more additional voxels that are connected to the first voxel and projected to a similar projection plane as the first voxel. Thereafter, the encoder 510 generates a patch for the connected component based on a subset of points included in any voxels represented by the connected component. The encoder 510 then identifies patch parameters from the subset of points assigned to the patch.

In step 1308, encoder 510 generates frames that include pixels that represent the patches. The frames include geometry frames, occupancy map frames and zero or more attribute frames that represent aspects of the point cloud such as color, reflectance, material, and the like. In step 1310, the encoder 510 encodes the frames that represent the 3D point cloud. After the frames representing 3D point cloud are encoded, the encoder 510 can multiplex the frames into a bitstream. In step 1312, the encoder 510 transmits the bitstream. The bitstream can be ultimately transmitted to a decoder, such as the decoder 550.

Although FIG. 13 illustrates one example of a method 1300 for generating patches, various changes may be made to FIG. 13. For example, while shown as a series of steps, various steps in FIG. 13 could overlap, occur in parallel, or occur any number of times.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An encoding device for point cloud encoding, the encoding device comprising:
    a processor configured to:
        segment an area including points representing a three-dimensional (3D) point cloud into multiple voxels of a first size,
        generate a patch information for each of the multiple voxels that include at least one of the points of the 3D point cloud, wherein the patch information for each of the multiple voxels includes a normal vector for one of the multiple voxels,
        identify patch border voxels based on the patch information,
        segment the patch border voxels into voxels of a second size, wherein the second size is smaller than the first size,
        identify additional patch border voxels based on additional patch information,
        assign the patch information of the multiple voxels to the points included in each respective voxel, to generate patches that represent the 3D point cloud,
        generate frames that include pixels that represent the patches, and
        encode the frames to generate a bitstream; and
    communication circuitry operably coupled to the processor, the communication circuitry configured to transmit the bitstream.

2. The encoding device of claim 1, wherein to segment the area into the multiple voxels, the processor is further configured to assign a subset of points to a first voxel of the multiple voxels based on a location of the subset of points and the location of the first voxel.

3. The encoding device of claim 2, wherein the processor is configured to:
    identify a center point of the subset of points within the first voxel; and
    identify the normal vector of the first voxel based on the center point.

4. The encoding device of claim 2, wherein the processor is configured to:
    identify a centroid of the subset of points within the first voxel; and
    identify the normal vector of the first voxel based on the centroid.

5. The encoding device of claim 1, wherein the patch information for each of the multiple voxels includes a partition number.

6. The encoding device of claim 1, wherein to generate the patch information for a first voxel of the multiple voxels, the processor is configured to:
    identify the normal vector associated with the first voxel, wherein the normal vector is perpendicular to an external surface of the 3D point cloud at a location of the first voxel; and
    assign one of multiple projection planes to the first voxel based on a direction of the normal vector.

7. The encoding device of claim 6, wherein to generate the patch information for the multiple voxels, the processor is configured to smooth the assigned projection plane of each of the multiple voxels over a surface of the 3D point cloud.

8. The encoding device of claim 1, wherein to assign the patch information of the multiple voxels to the points included in each respective voxel, the processor is configured to assign a partition index and the normal vector of a first voxel, of the multiple voxels, to a subset of points included in the first voxel.

9. The encoding device of claim 1, wherein to generate the patches, the processor is configured to:
    identify a connected component from the area, the connected component representing a first voxel of the multiple voxels and one or more additional voxels that are (i) connected to the first voxel and (ii) projected to a similar projection plane as the first voxel;
    generate a patch for the connected component based on a subset of points included in any voxels represented by the connected component; and
    identify patch parameters from the subset of points assigned to the patch.

10. A method for point cloud encoding, the method comprising:
    segmenting an area including points representing a three-dimensional (3D) point cloud into multiple voxels of a first size;
    generating a patch information for each of the multiple voxels that include at least one of the points of the 3D point cloud, wherein the patch information for each of the multiple voxels includes a normal vector for one of the multiple voxels;
    identifying patch border voxels based on the patch information;
    segmenting the patch border voxels into voxels of a second size, wherein the second size is smaller than the first size;
    identifying additional patch border voxels based on additional patch information;
    assigning the patch information of the multiple voxels to the points included in each respective voxel, to generate patches that represent the 3D point cloud;
    generating frames that include pixels that represent the patches;
    encoding the frames to generate a bitstream; and
    transmitting the bitstream.

11. The method of claim 10, wherein segmenting the area into the multiple voxels comprises assigning a subset of points to a first voxel of the multiple voxels based on a location of the subset of points and the location of the first voxel.

12. The method of claim 11, further comprising:
identifying a center point of the subset of points within the first voxel; and
identifying the normal vector of the first voxel based on the center point.

13. The method of claim 11, further comprising:
identifying a centroid of the subset of points within the first voxel; and
identifying the normal vector of the first voxel based on the centroid.

14. The method of claim 10, wherein the patch information for each of the multiple voxels includes a partition number.

15. The method of claim 10, wherein generating the patch information for a first voxel of the multiple voxels, comprises:
identifying the normal vector associated with the first voxel, wherein the normal vector is perpendicular to an external surface of the 3D point cloud at a location of the first voxel; and
assigning one of multiple projection planes to the first voxel based on a direction the normal vector.

16. The method of claim 15, wherein generating the patch information for the multiple voxels comprises smooth the assigned projection plane of each of the multiple voxels over a surface of the 3D point cloud.

17. The method of claim 10, wherein assigning the patch information of the multiple voxels to the points included in each respective voxel comprises assign a partition index and the normal vector of a first voxel, of the multiple voxels, to a subset of points included in the first voxel.

18. The method of claim 10, wherein generating the patches comprises:
identifying a connected component from the area, the connected component representing a first voxel of the multiple voxels and one or more additional voxels that are (i) connected to the first voxel and (ii) projected to a similar projection plane as the first voxel;
generating a patch for the connected component based on a subset of points included in any voxels represented by the connected component; and
identifying patch parameters from the subset of points assigned to the patch.

* * * * *